(12) United States Patent
Okamoto

(10) Patent No.: US 10,698,484 B2
(45) Date of Patent: Jun. 30, 2020

(54) INPUT DEVICE, BIOSENSOR, PROGRAM, COMPUTER-READABLE MEDIUM, AND MODE SETTING METHOD

(71) Applicant: ASAHI KASEI KABUSHIKI KAISHA, Tokyo (JP)

(72) Inventor: Akihiro Okamoto, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/370,102

(22) Filed: Dec. 6, 2016

(65) Prior Publication Data

US 2017/0083091 A1    Mar. 23, 2017

Related U.S. Application Data

(63) Continuation of application No. PCT/JP2015/003561, filed on Jul. 14, 2015.

(30) Foreign Application Priority Data

Jul. 15, 2014 (JP) .................................. 2014-144744

(51) Int. Cl.
*G06F 3/01* (2006.01)
*G06K 9/00* (2006.01)
(Continued)

(52) U.S. Cl.
CPC .............. *G06F 3/015* (2013.01); *G06F 3/011* (2013.01); *G06F 3/017* (2013.01); *G06F 3/0346* (2013.01);
(Continued)

(58) Field of Classification Search
CPC . G06F 3/01; G06F 3/011; G06F 3/014; G06F 3/015; G06F 3/017; G06F 3/0346;
(Continued)

(56) References Cited

U.S. PATENT DOCUMENTS 7,674,967 B2    3/2010   Makino
8,224,619 B2 *  7/2012   Onishi ............... G06F 3/0304
                                                                    702/150
(Continued)

FOREIGN PATENT DOCUMENTS

CN        1846610 A      10/2006
JP        2006-302490 A  11/2006
(Continued)

OTHER PUBLICATIONS

International Preliminary Report on Patentability dated Jan. 26, 2017, for the corresponding International Application No. PCT/JP2015/003561.

(Continued)

*Primary Examiner* — Jason M Mandeville
(74) *Attorney, Agent, or Firm* — Morgan, Lewis & Bockius LLP

(57) ABSTRACT

An object of the present invention is to provide an input device, a biosensor, a program, a computer-readable medium, and a mode setting method that enable errors in determining whether or not to set a mode of a control target device to be controlled to be reduced. An input device includes: a sensor signal acquisition unit configured to acquire a sensor signal; a waveform comparison unit configured to compare waveforms during two or more periods of the sensor signal; and a mode setting unit configured to, on the basis of a result of comparison by the waveform comparison unit, set a mode of a control target device to be controlled.

23 Claims, 14 Drawing Sheets

(51) Int. Cl.
*G06F 3/0346* (2013.01)
*G06F 3/038* (2013.01)
*G06F 3/16* (2006.01)

(52) U.S. Cl.
CPC ............ *G06F 3/0383* (2013.01); *G06F 3/165* (2013.01); *G06K 9/00355* (2013.01); *G06K 2009/00939* (2013.01)

(58) Field of Classification Search
CPC ... G06F 3/0383; G06F 3/165; G06K 9/00355; G06K 2009/00939; G11B 27/00
USPC .......................................... 345/156–158, 169
See application file for complete search history.

(56) References Cited

U.S. PATENT DOCUMENTS

| | | | | |
|---|---|---|---|---|
| 9,361,618 | B2* | 6/2016 | Beadle | G06Q 20/401 |
| 9,430,039 | B2* | 8/2016 | Ahn | G06F 3/011 |
| 9,892,623 | B2* | 2/2018 | Dixon | G08B 25/001 |
| 2005/0271252 | A1* | 12/2005 | Yamada | G06K 9/00248 |
| | | | | 382/103 |
| 2006/0220882 | A1 | 10/2006 | Makino | |
| 2006/0243120 | A1 | 11/2006 | Takai et al. | |
| 2007/0272599 | A1* | 11/2007 | Miyashita | A61B 5/1101 |
| | | | | 209/527 |
| 2010/0204953 | A1* | 8/2010 | Onishi | G06F 3/0304 |
| | | | | 702/150 |
| 2013/0002544 | A1 | 1/2013 | Norieda et al. | |
| 2014/0270375 | A1* | 9/2014 | Canavan | A63B 24/0062 |
| | | | | 382/103 |
| 2014/0320799 | A1 | 10/2014 | Pugh et al. | |
| 2015/0022316 | A1* | 1/2015 | Dixon | G08B 25/001 |
| | | | | 340/5.51 |
| 2015/0135310 | A1* | 5/2015 | Lee | A61B 5/681 |
| | | | | 726/20 |
| 2016/0054804 | A1* | 2/2016 | Gollakata | G06F 3/017 |
| | | | | 345/156 |

FOREIGN PATENT DOCUMENTS

| | | |
|---|---|---|
| JP | 2008-099834 A | 5/2008 |
| JP | 2008-242063 A | 10/2008 |
| JP | 2009-291379 A | 12/2009 |
| JP | 2010-079848 A | 4/2010 |
| JP | 2013-214073 A | 10/2013 |
| WO | 2011/115060 A1 | 9/2011 |

OTHER PUBLICATIONS

Yamamoto et al., "An Input Interface using Foot Step for Information Handling on Walking and Jogging styles", IPSJ SIG Technical Reports, Feb. 10, 2007, vol. 2007, No. 11, pp. 79-84 (includes English abstract).
International Search Report dated Sep. 29, 2015 for corresponding International application No. PCT/JP2015/003561.

* cited by examiner

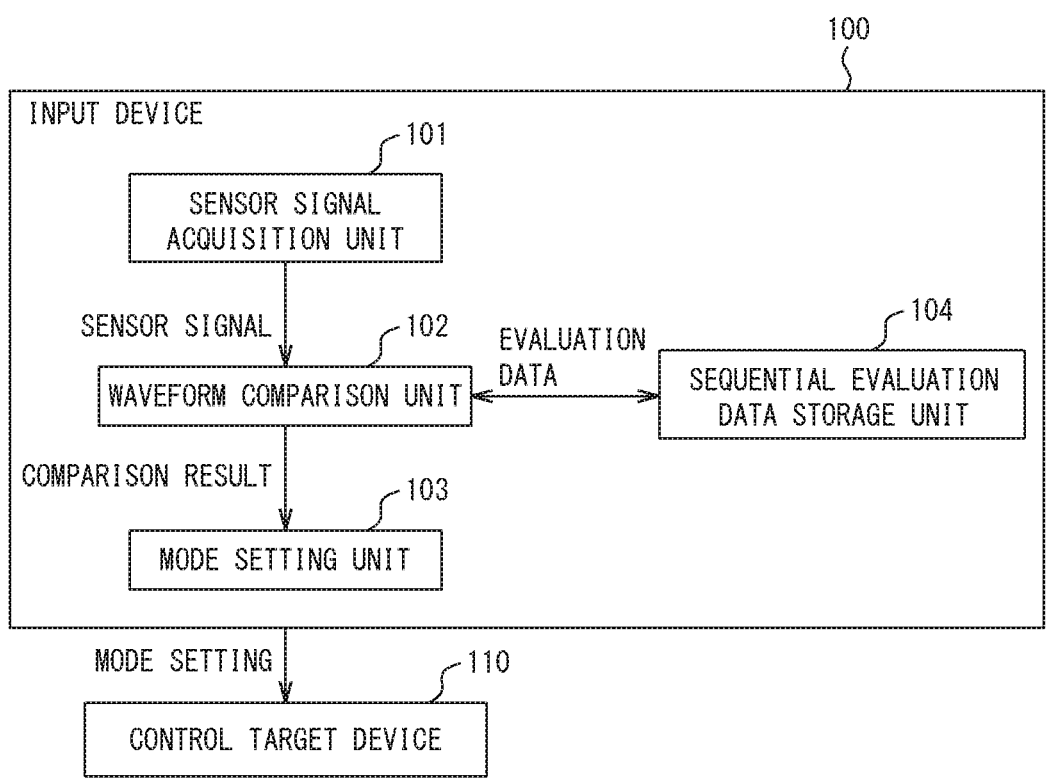

FIG. 2A
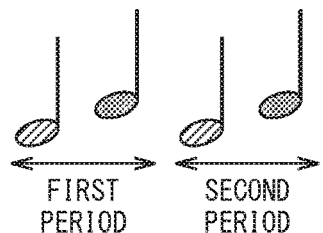
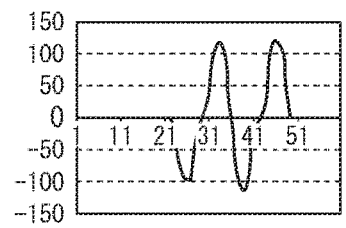
FIG. 2B
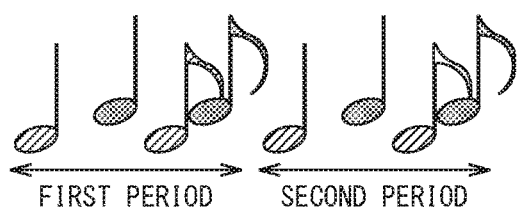
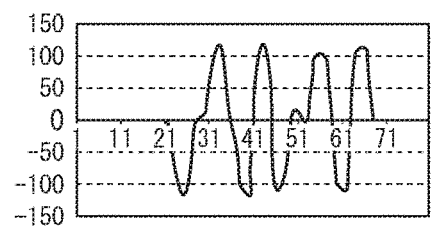
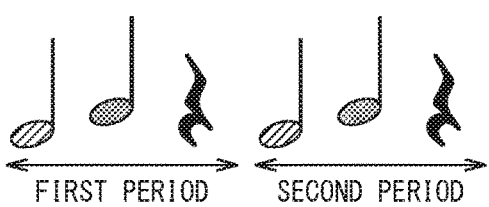
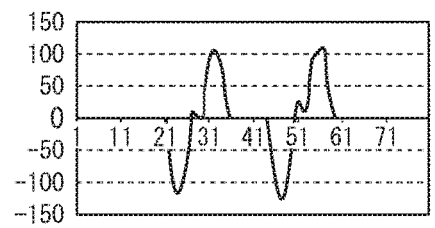
FIG. 2C
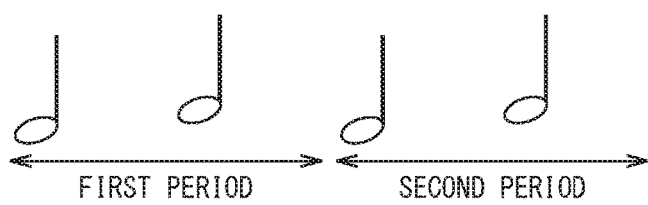
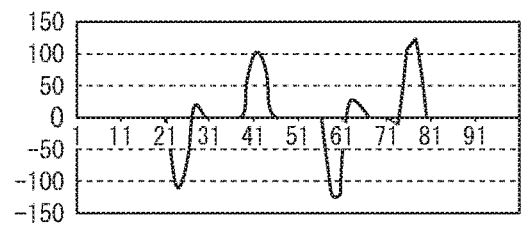
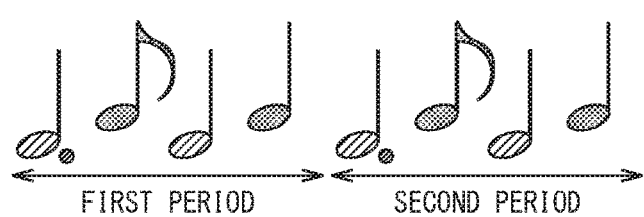
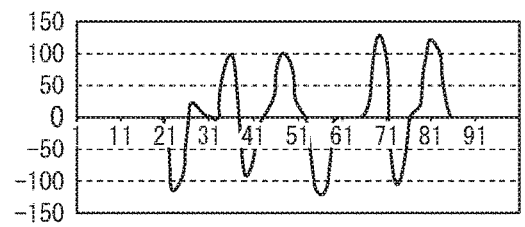

FIG. 11A
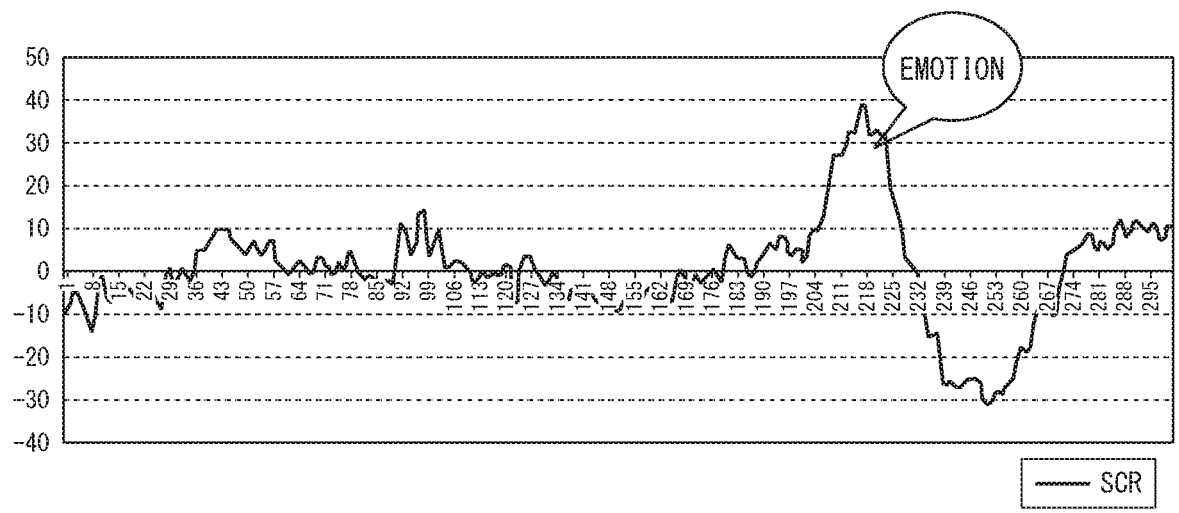
FIG. 11B
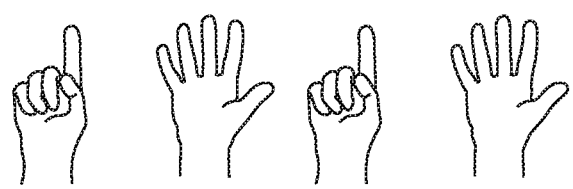
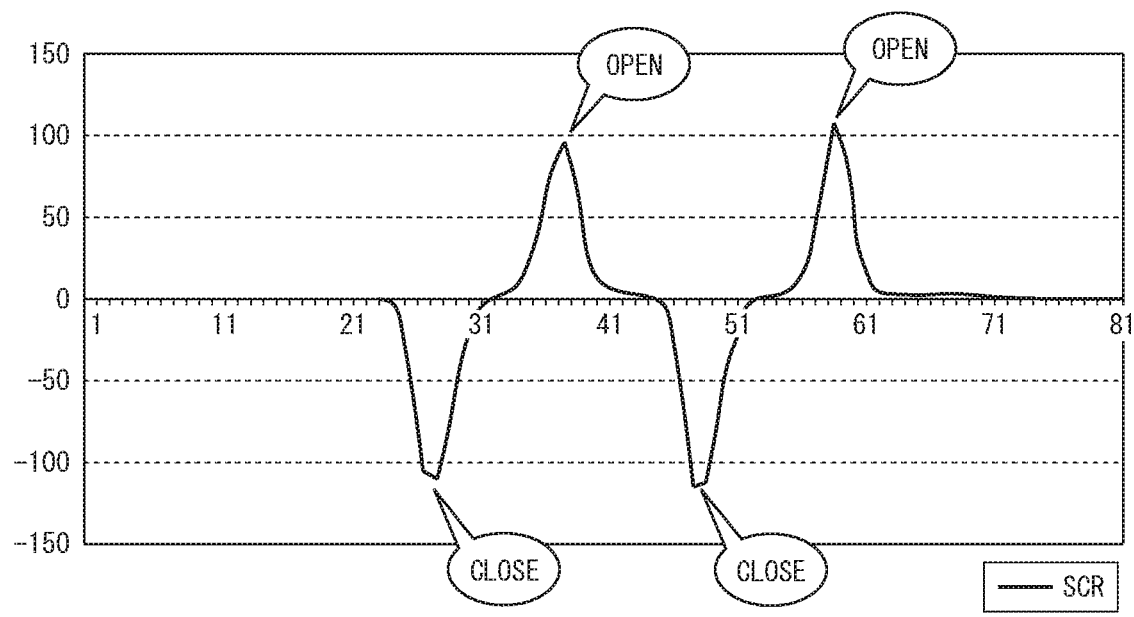

INPUT DEVICE, BIOSENSOR, PROGRAM, COMPUTER-READABLE MEDIUM, AND MODE SETTING METHOD

CROSS-REFERENCE TO RELATED APPLICATION

This application is a continuation application of International Application PCT/JP2015/003561 filed on Jul. 14, 2015 and designated the U.S., the entire contents of which are incorporated herein by reference.

TECHNICAL FIELD

The present invention relates to an input device, a biosensor, a program, a computer-readable medium, and a mode setting method for inputting a signal representing motions of a user that are detected by a sensor attached to the user.

BACKGROUND ART

In PTL 1, a method of increasing varieties of switchable modes by registering, in advance, blink patterns each expressed by feature quantities including the length of time during which an eye is closed and the length of time during which the eye is opened in a blink and detecting whether or not a user has reproduced a blink of the same pattern as one of the pre-registered blink patterns is disclosed.

CITATION LIST

Patent Literature

PTL 1: JP 2013-214073 A

SUMMARY OF INVENTION

Technical Problem

However, in a technology described in PTL 1, since motion patterns of blinking are registered in advance, it requires a lot of work to make every user register his/her motion pattern of blinking. Furthermore, it is not easy for a user to accurately reproduce the same blinking motion as the blinking motion that the user himself/herself has registered. On the other hand, in a method of defining a motion pattern of blinking that is common to all users in advance, the users are requested to reproduce the length of the motion time of the registered motion accurately, which leads to a difficulty in achieving the method.

That is, the above-described conventional technology has a problem in that there is a high possibility of causing an error in determining whether or not to set a mode of a control target to be controlled because reproducing a pre-registered motion pattern of blinking is not easy.

An object of the present invention is to provide an input device, a biosensor, a program, a computer-readable medium, and a mode setting method that enable errors in determining whether or not to set a mode of a control target to be controlled to be reduced.

Solution to Problem

In order to achieve the object mentioned above, according to one aspect of the present invention, there is provided an input device including: a sensor signal acquisition unit configured to acquire a sensor signal; a waveform comparison unit configured to compare waveforms during two or more periods of the sensor signal; and a mode setting unit configured to, on the basis of a result of comparison by the waveform comparison unit, set a mode of a control target device to be controlled.

In order to achieve the object mentioned above, according to one aspect of the present invention, there is provided a program making a computer function as the input device according to the aspect of the present invention described above.

In order to achieve the object mentioned above, according to one aspect of the present invention, there is provided a computer-readable medium including the program according to the aspect of the present invention described above.

In order to achieve the object mentioned above, according to one aspect of the present invention, there is provided a mode setting method including: comparing waveforms during two or more periods of a sensor signal; and on the basis of a result of comparison between the waveforms, setting a mode of a control target device to be controlled.

In order to achieve the object mentioned above, according to one aspect of the present invention, there is provided a biosensor that is attached to a living body and acquires biological information from the living body, including: a sensor signal acquisition unit configured to acquire a sampled sensor signal; a waveform comparison unit configured to compare waveforms during two or more periods of the sensor signal; and a mode setting unit configured to, on the basis of a result of comparison by the waveform comparison unit, set a mode of a control target device to be controlled.

Advantageous Effects of Invention

Respective modes of the present invention enable errors in determining whether or not to set a mode of a control target to be controlled to be reduced.

BRIEF DESCRIPTION OF DRAWINGS

FIG. 1 is a functional block diagram illustrative of an input device according to a first exemplary embodiment of the present invention;

FIGS. 2A to 2C are diagrams which describe the first exemplary embodiment of the present invention and illustrate combinations of rhythm and tempo;

FIGS. 11A and 11B are diagrams for a description of the third exemplary embodiment of the present invention and a graph of adjacent differences of a signal from a skin electrical resistance sensor;

DESCRIPTION OF EXEMPLARY EMBODIMENTS

First Exemplary Embodiment

Figure 3:
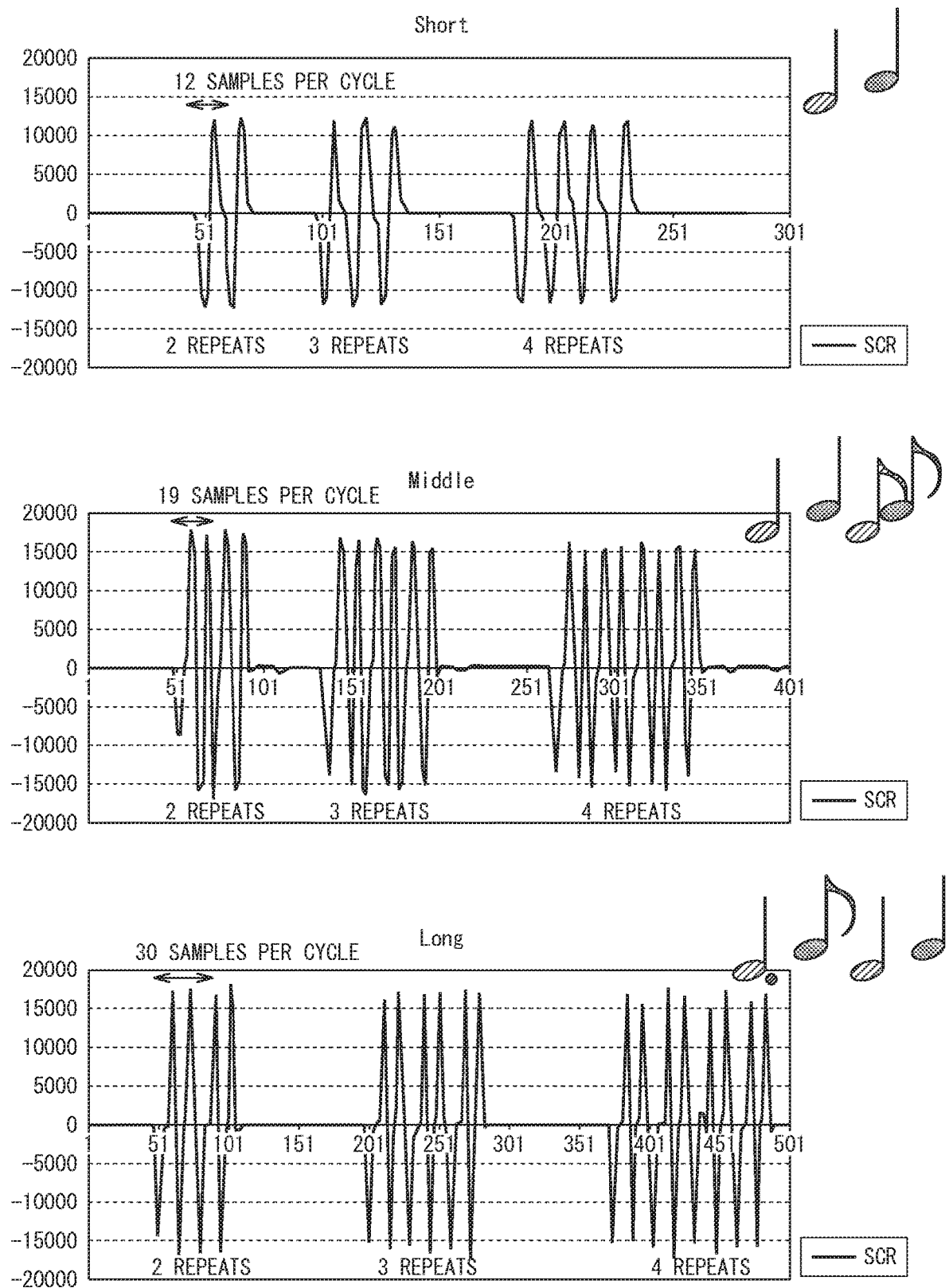
FIG. 3 is a diagram for a description of the first exemplary embodiment of the present invention and illustrative of nine variations that are definable in accordance with motion time and the number of repeats of a motion.

A first exemplary embodiment of the present invention is characterized in that, taking notice that it is easy for a user to rhythmically repeat a motion two or more times consecutively, a degree to which a sampled input signal is considered to be waveforms of two successive cycles is evaluated and, on the basis of a result of the evaluation, a mode of a control target to be controlled is switched. The repetitive motion is not required to be registered in advance, may be created on the spot by a user without constraint, and is changeable as needed. Hereinafter, an input device according to the exemplary embodiment will be described.

FIG. 1 is a functional block diagram illustrative of an input device of the first exemplary embodiment.

An input device 100 of the exemplary embodiment includes a sensor signal acquisition unit 101 that acquires a sensor signal, a waveform comparison unit 102 that compares waveforms during two or more periods of the sensor signal, and a mode setting unit 103 that sets a mode of a control target device 110 to be controlled on the basis of a result of comparison from the waveform comparison unit. The sensor signal is a signal that is sampled by a sensor configured to be attached to a living body. The input device 100 also includes a sequential evaluation data storage unit 104 that stores evaluation data which are the sensor signal, or data obtained by processing the sensor signal using a predetermined processing method. The input device 100 is connected to the control target device 110, which is to be subjected to mode setting. The input device 100 and the control target device 110 are interconnected by a wired or wireless means or by way of a network. In a mode setting method that is performed using the input device 100, for example, waveforms during two or more periods of a sensor signal are compared with one another by the waveform comparison unit 102, and, on the basis of a result of comparison among the waveforms, a mode of the control target device 110 is set by the mode setting unit 103.

The sensor signal acquisition unit 101 is a hardware portion of a sensor. The sensor signal acquisition unit 101 may be not only a motion sensor for detecting user motions, such as an acceleration sensor and an angular velocity sensor (gyro), but also an air pressure sensor for detecting, for example, up-and-down motions. Furthermore, the sensor signal acquisition unit 101 may be a sensor that, with a magnet and a magnetic sensor attached to a fingertip and a wrist, respectively, detects a change in a positional relation between the magnet and the magnetic sensor caused by a motion of the hand.

Furthermore, the sensor signal acquisition unit 101 may use motion artifacts in a skin conductivity sensor that is attached to the inner side of a palm or a wrist and measures skin conductivity (the inverse of skin electrical resistance) between two electrodes to detect an occurrence of an emotion of the user. The motion artifacts are signals that are generated by changes in a contact state between skin and an electrode caused by a user motion. Since being not signals derived from an emotion, motion artifacts are usually discarded as noise. Similarly, motion artifacts in a pulse wave sensor using a light emitting diode (LED) and a photo diode (PD) may also be used.

The sensor used in the present invention is not limited to the afore-described sensors. The sensor used in the present invention may be any sensor that is capable of acquiring digital data at constant time intervals. All sensors that are capable of sensing changes in a waveform caused by user motions, even if the changes are signals that are usually discarded as noise, are included in the candidate sensors usable in the present invention.

By equipping a device that is used by being attached to a wrist with a skin conductivity sensor and an acceleration sensor and using a feature that, when a user opens and closes his/her hand while standing still, a periodical motion artifact signal as intended by the user is generated by only the skin conductivity sensor, and, when the user walks or runs, periodical motion artifact signals that the user does not intend are generated by both the skin conductivity sensor and the acceleration sensor, whether a periodical motion artifact signal generated by the skin conductivity sensor is generated by the user intentionally or without intention can be discriminated. An angular velocity sensor may also be used in place of the acceleration sensor.

The waveform comparison unit 102, the mode setting unit 103, and the sequential evaluation data storage unit 104 are achieved by a not-illustrated microcomputer having a CPU (Central Processing Unit) and a memory device.

The waveform comparison unit 102 uses a sensor signal sampled by the sensor signal acquisition unit 101 as an input thereto. The waveform comparison unit 102 may use the sensor signal as evaluation data as it is. The waveform comparison unit 102 may also obtain the N-th order differences (N is one or greater) between adjacent sensor signal values of the input sensor signal and use the obtained N-th order differences as evaluation data.

The sequential evaluation data storage unit 104 is configured in the afore-described not-illustrated memory device and stores the afore-described evaluation data generated by the waveform comparison unit 102 in chronological order. The evaluation data that the sequential evaluation data storage unit 104 stores are a sensor signal or data obtained by processing the sensor signal using a predetermined processing method.

For the afore-described adjacent differences, which are obtainable as differences between adjacent sensor signal values, not only differences with the previous sensor signal values but also differences with the M-th previous sensor signal values may be used. Setting M at a large value enables influence of noise due to electrical fluctuation that a sensor has to be reduced. It is suitable to set the value of M in accordance with a sampling frequency of a sensor and a rate of change in a waveform generated by user motions. The value of M is, for example, set to a value in a range from 2 to 6 when a motion that changes every 0.5 sec is to be sensed using a sensor with a sampling frequency of 20 Hz.

With regard to the afore-described skin conductivity sensor and pulse wave sensor, obtaining the first-order differences yields such evaluation data that the values thereof are distributed to positive and negative values in a balanced manner. Therefore, a skin conductivity sensor and a pulse wave sensor are suitable for performing comparison based on a pattern of data in which values having the same sign appear consecutively, which will be described later. In a method in which data having the same sign are given attention, however, it is required to correct the data after determining whether or not the sensor signal is in a long-term upward trend or downward trend. With regard to the afore-described skin conductivity sensor, it has been known that, after the sensor is attached, skin conductivity increases gradually due to thermal sweating. In this condition, to identify, for example, a motion the maximum duration of which for two cycles is 4 sec, it is suitable to obtain an arithmetic mean (trim mean) of only a half of data that take central values out of data during the last 8 sec or longer and perform correction.

The waveform comparison unit 102 compares waveforms on the basis of a correlation coefficient of the waveforms during two or more periods. When a sequential data {(xi, yi)} (i=1, 2, . . . , n) each element of which is made up of two pairs of numerical values is given, a correlation coefficient of the sequential data is obtained by the formula (1) below.

[Formula 1]

$$\frac{\sum_{i=1}^{n}(x_i-\overline{x})(y_i-\overline{y})}{\sqrt{\sum_{i=1}^{n}(x_i-\overline{x})^2}\sqrt{\sum_{i=1}^{n}(y_i-\overline{y})^2}} \quad (1)$$

where $\overline{x}$ and $\overline{y}$ are arithmetic means of data x={xi} and data y={yi}, respectively.

The waveform comparison unit 102 evaluates a degree to which the waveform of evaluation data acquired in such a manner is considered as a waveform made up of two consecutive cycles and outputs the evaluated degree as a result of comparison. Information of the result of comparison is made up of information on whether or not the user has repeated the same motion, motion time per motion when it is determined that the user has repeated the same motion, and information on the number of repeats.

The mode setting unit 103 is configured to set a mode of the control target device 110 when the waveforms during two or more periods are substantially identical and set a mode of the control target device 110 in accordance with the time length of waveforms determined to be substantially identical. For example, the mode setting unit 103 uses the afore-described result of comparison as an input thereto. When the user repeats the same motion, the mode setting unit 103 switches modes of the control target device 110 in accordance with motion time and the number of repeats of a motion and sets a new mode. It is suitable to use rhythm and tempo to increase variation of motion time.

FIGS. 2A to 2C are diagrams illustrative of combinations of rhythm and tempo. FIGS. 2A, 2B, and 2C illustrate a combination of motions of short motion time, combinations of motions of middle motion time, and combinations of motions of long motion time, respectively. Treating "closing and opening" as one set of motions and combining the rhythm and tempo of the set of motions enable variation of switching to be increased.

For example, while the upper row in FIG. 2C illustrates an example of achieving a combination of motions of long motion time by lengthening time per motion taken to open or close a hand, it is actually difficult for a user to repeat a motion of long motion time rhythmically, and, as illustrated in the lower row in FIG. 2C, it is preferable to shorten the time per motion taken to open or close a hand. Although, in the lower row in FIG. 2C, two sets of "closing and opening" are included in a period, there is no correlation between the first set and the second set because the first set has a speed of opening and closing, that is, a rhythm, different from the second set, and it is determined that there is a correlation only after two sets in the succeeding second period and two sets in the first period are compared with each other.

As exemplified by the opening and closing methods illustrated in the upper row in FIG. 2B and the lower row in FIG. 2C, it is possible to design a motion that generates waveforms that, while being substantially identical during two periods, do not include waveforms that are considered to be substantially identical within one period and that users are able to repeat in almost the same tempo.

FIG. 3 is a diagram illustrative of nine variations that are definable in accordance with motion time and the number of repeats of a motion and illustrates waveform charts corresponding to Table 1 below. The upper row, the middle row, and the lower row in FIG. 3 correspond to entries "Short", "Middle", and "Long", respectively, in the column labeled "Motion time" exhibited in Table 1. When, for example, the control target device is a music player, classifying variations of motion time into three types including short time, middle time, and long time and classifying variations of the number of repeats of a motion into three types including two to four motions enable nine types of modes exhibited in Table 1 to be set.

Although the above description was made assuming an example of setting a mode of a music player, which is incorporated into a smartphone or a headphone, using a skin conductivity sensor attached to a wrist, the sensor and the control target device do not have to be separate devices, and the skin conductivity sensor and the music player may be incorporated into a smart watch.

TABLE 1

| Motion time | The number of repeats of motion | Mode |
|---|---|---|
| Short | 2 | normal playback (cancellation of pause/fast-forward/fast-reverse) or pause |
|  | 3 | turn up the volume 3 dB |
|  | 4 | turn down the volume 3 dB |
| Middle | 2 | skip to the next tune |
|  | 3 | return to the head of the tune |
|  | 4 | return to the head of the previous tune |
| Long | 2 | fast-forward playback |
|  | 3 | fast-reverse playback |
|  | 4 | call of music selection functions, such as voice recognition |

Alternatively, a tempo may be calculated based on motion time without classifying variations of motion time on the basis of a threshold value, and a piece of music coinciding with the calculated tempo may be selected automatically. The automatic selection of music on the basis of tempo is useful in selecting background music coinciding with a tempo at which the user runs in jogging. When the control target device is a game machine, it is possible to convert motion time to speed and control a property related to speed in a game. Objects to be controlled on the basis of detected motion time do not have to be limited to properties related to time and speed, and all types of properties that change continuously and gradually, such as volume, luminance, color, capacity, area, distance, temperature, humidity, hardness, and an angle, may serve as objects to be controlled.

A method for comparing waveforms during two or more periods in the waveform comparison unit 102 will be described. In particular, taking notice that it is easy for a user to repeat a motion two or more times rhythmically, an evaluation method of a degree to which an input signal is considered to be waveforms of two successive cycles will be described, using, as an example, a case of the afore-described skin conductivity sensor with a sampling frequency of 20 Hz.

The two or more periods are two periods that are adjacent to each other on the time axis. When a correlation coefficient is used in the case in which two periods are adjacent to each other on the time axis as described above, assuming N pieces of data going back from the latest piece of input data as one period and N pieces of data from the (N+1)th previous piece of data to the (N+N)th previous piece of data as another period that is a target for comparison, a correlation coefficient over the two periods is obtained.

Every time a sensor signal value is input, correlation coefficients are obtained with respect to all possible values of N that correspond to motion time during which a person is able to perform motions. When, for example, design is performed targeting cycles of 0.5 sec to 2 sec, correlation coefficients are calculated with respect to 31 values of N by changing N by one from 10 to 40 and the existence of a correlation is determined on the basis of whether or not one of the correlation coefficients exceeds a preset threshold value. For a correlation coefficient expressed by the formula (1), it is suitable to set the threshold value to be 0.95. It is obvious that squaring the numerator as 0.95×0.95=0.9 to omit calculation of the square root of the denominator and performing comparison with 0.9 enable a processing amount to be reduced.

Figure 4:
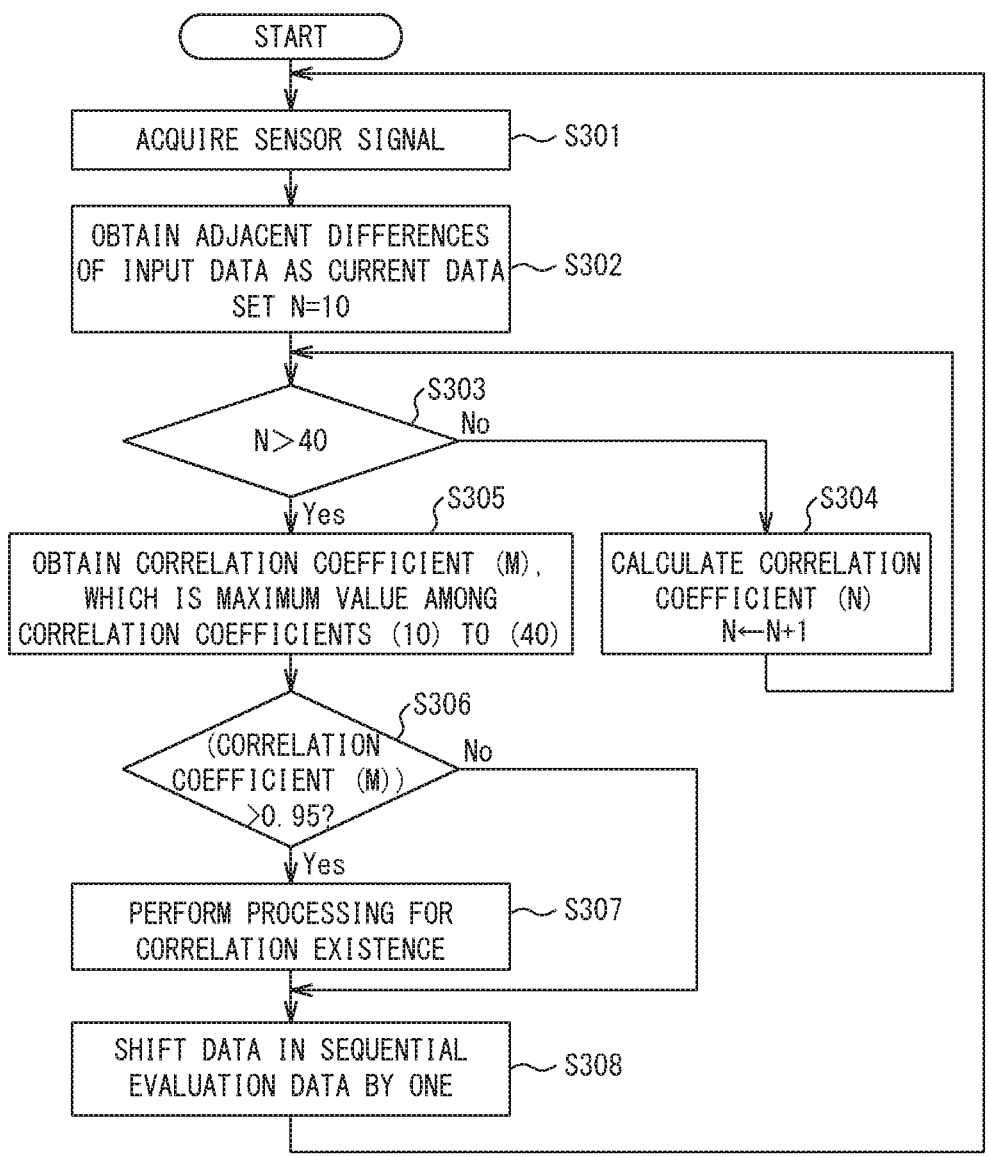
FIG. 4 is a diagram for a description of the first exemplary embodiment of the present invention and a flowchart illustrative of an example of a flow of a waveform comparison method using a correlation coefficient in a waveform comparison unit 102.

FIG. 4 is a flowchart for a description of an example of a waveform comparison method using a correlation coefficient in the waveform comparison unit 102.

In step S301, a sensor signal value is acquired at a fixed time interval by a sensor in the sensor signal acquisition unit 101.

In step S302 succeeding step S301, a piece of evaluation data is obtained by subtracting, from the acquired sensor signal value, a sensor signal value acquired at the previous sampling time. Each piece of evaluation data is given a notation, such as evaluation data (No. 1), evaluation data (No. 2), and so on, by numbering the pieces of evaluation data going back from a current piece of evaluation data to the past. Since, when the maximum length of one cycle, during which evaluation is performed using a 20 Hz sampling rate, is 2 sec, a period includes 40 pieces of evaluation data, and, when three consecutive sets of motions are to be checked, three periods include 120 pieces of evaluation data, and pieces of evaluation data up to the evaluation data (No. 120) at the most are stored in the afore-described sequential evaluation data storage unit 104. Subsequently, to obtain a correlation coefficient based on a combination of the evaluation data (No. 1) to (No. 10) and the evaluation data (No. 11) to (No. 20), the variable N is set at 10.

In step S303 succeeding step S302, determination processing is performed to, if the variable N has a value of not more than 40, repeat step S304 of obtaining a correlation coefficient and, if the variable N is larger than 40, proceed to step S305.

In step S304, a correlation coefficient between the evaluation data (No. 1) to (No. N) and the evaluation data (No. N+1) to (No. N+N) is obtained and stored, as a correlation coefficient (N), in a not-illustrated memory device of the afore-described waveform comparison unit 102. The variable N, which also plays a role as a counter for loop processing, is incremented by one and the process returns to step S303.

In step S305, a correlation coefficient (M) that is a maximum value among correlation coefficients (10) to (40) is obtained.

In step S306 succeeding step S305, determination processing is performed to, if the maximum correlation coefficient (M) has a value of not less than 0.95, proceed to step S307 so as to perform processing for the case of existence of a correlation, and, if the correlation coefficient (M) has a value of less than 0.95, determine that there is no correlation and proceed to step S308.

In step S307, predetermined mode setting processing for the case in which a correlation is determined to exist is performed. Since a value of M is equivalent to motion time, it is possible to determine the value of M and use the determined value of M for mode setting of the afore-described music player.

In step S308, in preparation for acquisition of another sensor signal value, the evaluation data (No. 119), (No. 118), ..., (No. 1) are shifted, by one, to the evaluation data (No. 120), (No. 119), ..., and (No. 2), respectively, and the process returns to step S301.

When evaluation is performed on the basis of correlation coefficients, once a correlation coefficient (M) exceeds 0.95, acquiring a next sensor signal value and obtaining another correlation coefficient often result in that a correlation coefficient (M) or a correlation coefficient (M+1) exceeds the threshold value of 0.95 again. Since such a situation may lead to performing unnecessary mode setting, step S301, step S302, and step S308 are repeated so as not to perform evaluation of correlations for M sensor signal values that are to be input subsequently. In the case of not performing mode setting at the second repeat of a motion and waiting to see whether or not the third or subsequent repeat of a motion is performed, it is preferable to define a repeat count storage variable and count the number of repeats. That is, the repeat count storage variable is set at zero at activation, and, when it is first determined that there exists a correlation, the repeat count storage variable is set at 2. Subsequently, M sensor signal values are skipped, and, when another evaluation of a correlation coefficient (M) is performed and results in a determination that there exists a correlation, the repeat count storage variable is set at 3 by adding 1 to the current value.

It can also be considered that boundaries of two periods are not positioned exactly adjacent to each other depending on a difference in rhythmical sense or a degree of mastery of operations among respective users. Alternatively, the same situation applies to a case of a high sampling frequency. In this case, a buffer may be defined assuming that two periods overlap each other or are separated from each other with a space therebetween, and the afore-described N pieces of data from the (N+1)th previous piece of data to the (N+N)th previous piece of data may be redefined as, for example, "N pieces of data from the (N+1+B)th previous piece of data to the (N+N+B)th previous piece of data, where B is ±1". As described above, two or more periods are allowed to overlap each other or be separated from each other by the number of samples (B samples in the example) equivalent to within a predetermined period. Since, as illustrated in FIG. 3, "Middle" motion time is one and a half times of "Short" motion time, it is suitable to set the range B within plus/minus 25 percent of N to discriminate motions of the two time lengths from each other.

The afore-described correlation coefficients are normalized using arithmetic means with respect to each period. In actuality, there is such a type of noise that positive values occupy a large part of one period and negative values occupy a large part of the other period. However, there is a case in which, when a correlation coefficient is normalized in each period, the correlation coefficient for such a type of noise becomes large. Taking notice that a waveform generated by a user repeating the same motion does not include such biases that differ from each other with respect to each period, using an arithmetic mean over all evaluation data in two periods for the two periods in common enables an improvement in eliminating only the noise to be achieved.

In actuality, there exists a noise including similar figures, that is, figures having different amplitudes but similar shapes, during two periods, and the correlation coefficient of such a noise also becomes large sometimes. Taking notice that waveforms generated by a user repeating the same motion have almost the same amplitudes, using absolute values or square values of a signal within a period to eliminate such noise including similar figures and comparing total sums, mean values, maximum values, and the like of the absolute values or the square values enable the afore-described evaluation method based on correlation coefficients to be improved.

Correlation coefficients have a characteristic that the values thereof become large only because points of time at which the amplitudes of two signals reach peaks coincide with each other. For example, there is a case in which, when two peaks in a signal sampled at a sampling frequency of 20 Hz and representing motions with a motion cycle of 1 sec coincide with each other, the correlation coefficient exceeds 0.95. This situation leads to a fault that mode setting is executed in the middle of a motion performed by a user.

As a counter-measure against the above fault, a method of obtaining a total sum of the absolute values of differences between pieces of data at points of time that correspond to each other, such as the first previous piece of data and the (N+1)th previous piece of data, the second previous piece of data and the (N+2)th previous piece of data, and so on, and performing determination on the basis of the obtained total sum is applicable.

Lest data made up of a string of zeros because of a user not performing a motion at all are incorrectly determined to have a correlation, a total sum of the absolute values of amplitudes is obtained and compared with a threshold value.

In a case in which signs in evaluation data are distributed to positive signs and negative signs in a balanced manner and, in the long run, an arithmetic mean can be assumed to be zero, it is suitable to give attention to the signs of data values. All infinitesimal values that are close to zero, which represents a state in which there is no user motion, are first replaced with zero, and, after the rest of data are replaced with either plus one or minus one by giving attention to only the signs thereof, a correlation coefficient is calculated. In this case, since correction processing based on a mean value can be omitted assuming the mean value to be zero, square calculation of the denominator yields only 1 or 0, and multiplication of the numerator yields only ±1, depending on a combination of positive and negative numbers, or 0, the amount of calculation can be reduced substantially. The problem concerning waveforms that have similar figures with only amplitudes being different can be solved by obtaining a total sum of the absolute values of amplitudes and comparing the total sum with a threshold value.

Second Exemplary Embodiment

Figure 5:
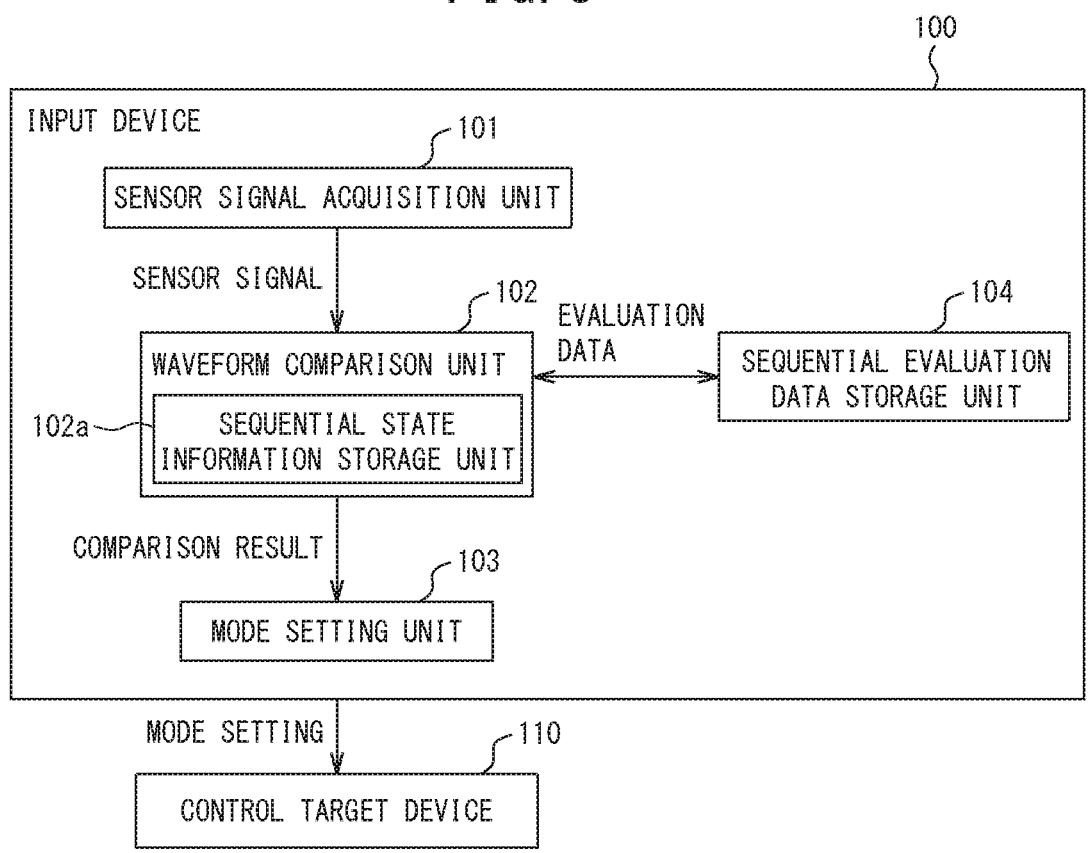
FIG. 5 is a functional block diagram illustrative of an input device according to a second exemplary embodiment of the present invention.

As illustrated in FIG. 5, since configurations of hardware and functional blocks are the same as those of the first exemplary embodiment except that a waveform comparison unit 102 includes a sequential state information storage unit 102a, a detailed description will be omitted.

As a method for solving the problem concerning waveforms having similar figures and reducing the amount of processing substantially, it is suitable to give attention to patterns of the length of a period during which data having the same sign appear consecutively and the area of the data over the period. For example, when using a skin conductivity sensor or a pulse wave sensor, obtaining adjacent differences of input data enables sequential data the signs of which are distributed to positive signs and negative signs in a balanced manner in accordance with user motions to be acquired. As will be described in detail later, assuming a sub-period to be a unit periods during which pieces of evaluation data having the same sign appear consecutively and a piece of state information to be information including sign information, a period length representing the number of pieces of evaluation data belonging to a sub-period, and an area representing the total sum of values of pieces of evaluation data belonging to the sub-period or the total sum of the absolute values of values of pieces of evaluation data belonging to the sub-period, the waveform comparison unit 102 stores the pieces of state information into the sequential state information storage unit 102a in units of a sub-period in chronological order. Furthermore, the waveform comparison unit 102 is configured to compare waveforms during two adjacent periods based on pieces of state information of respective pairs of sub-periods that correspond to each other in chronological order over the two adjacent periods.

Figure 6:
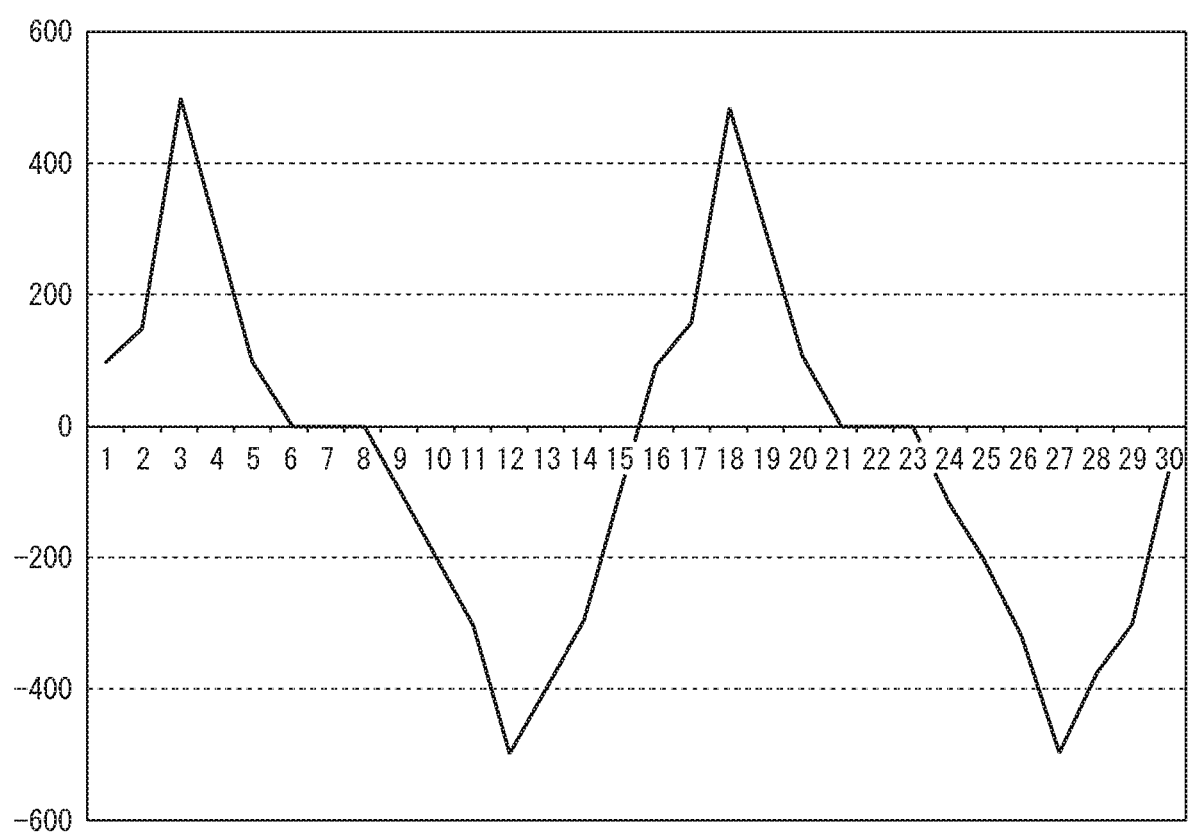
FIG. 6 is a diagram for a description of the second exemplary embodiment of the present invention and a graph illustrative of a sign pattern.

FIG. 6 illustrates a waveform example in comparing waveforms during two or more periods based on signs and areas thereof.

A set of five consecutive pieces of data that have positive values, a set of seven consecutive pieces of data that have negative values, and a set of three consecutive infinitesimal values whose amplitude is close to zero, which represents a state in which there is no user motion, are denoted by P(5), M(7), and Z(3), respectively. Each of P(n), M(n), and Z(n) (n is an arbitrary integer) is equivalent to a sub-period with a period during which evaluation data having the same sign appear consecutively as a unit. P, M, and Z indicate sign information individually, and n indicates a period length that represents the number of pieces of evaluation data belonging to a sub-period. When, for example, a sequence "P(5)Z(3) M(7)P(5)Z(3)M(7)", which is arranged going back from a current point of time to the past, is given, by treating 15 (=5+3+7) pieces of data as one cycle, the sequence is determined to have a correlation. In the sequence "P(5)Z(3) M(7)P(5)Z(3)M(7)", the values of period lengths n are, starting from the left, 5, 3, 7, 5, 3, and 7.

Since a sequence "P(5)Z(3)P(7)P(5)Z(3)M(7)" includes appearance patterns of signs [P, Z, P] and [P, Z, M], which do not coincide with each other, it is determined that there is no correlation.

While a sequence "P(5)Z(3)M(7)P(3)Z(3)M(7)" includes appearance patterns [P, Z, M] and [P, Z, M] of signs, which coincide with each other, the sequence includes patterns [5, 3, 7] and [3, 3, 7] of the numbers of consecutive appearances of each sign, which do not coincide with each other, and it is thus determined that there is no correlation.

State changes are not limited to the above-described combination of three elements, and may be expressed in a combination of four elements, such as "P(6)M(6)P(3)M(3) P(6)M(6)P(3)M(3)". When a system designer determines that motions "apparently cannot be performed by a person", the number of state changes may be limited for the purpose of a reduction in the amount of processing.

Next, use of areas to solve the problem concerning waveforms having similar figures will be described. The use of areas is achieved by simply adding up the values of pieces of data that are consecutively input over a period during which the signs of the pieces of data are kept at the same sign. It is assumed that, as illustrated in FIG. 6, the original data, that is, pieces of evaluation data belonging to respective sub-periods, of, for example, a sequence "P(5)Z(3)M (7)P(5)Z(3)M(7)" have the following values:

P(5): 100, 150, 500, 300, 100;
Z(3): 1, 0, −2;
M(7): −100, −200, −300, −500, −400, −300, −100;
P(5): 90, 160, 490, 310, 110;
Z(3): 2, 0, 1; and
M(7): −110, −210, −320, −500, −380, −300, −70.

In this case, for example, an area that represents the total sum of values of pieces of evaluation data belonging to a sub-period P(5), which, as described above, includes the original data "100, 150, 500, 300, 100", is calculated as "100+150+500+300+100=1150". For each of the other sub-periods, an area that represents the total sum of values of pieces of evaluation data belonging to the sub-period can be obtained in a similar manner. Therefore, areas representing the total sums of values of pieces of evaluation data belonging to the sub-periods P(5), M(7), and Z(3) are calculated as "P(1150)Z(−1)M(−1900)P(1160)Z (3)M(−1890)". Areas over periods denoted by the letter M, which are periods during which pieces of data have negative values, may be expressed, using absolute values, as M(1900) and M(1890). Respective areas, sign information, and period lengths, which are obtained in the method described above, are stored, as state information, into the sequential state information storage unit 102a in units of a sub-period in chronological order.

Since values in a sub-period denoted by Z are natively infinitesimal, the area of the sub-period need not be evaluated. It is suitable to obtain area ratios between combination partners correlating with each other with respect to a pair of the sub-periods P(5) and a pair of the sub-M(7) and prescribe that, when the obtained area ratios are, for example, not more than 1.5, there is a correlation.

The waveform comparison unit 102 compares state information (calculated areas) with respect to each of the pair of sub-periods P(5) and the pair of sub-periods M(7), both corresponding to each other in a chronological manner over the two adjacent periods. The pair of sub-periods P(5) is determined to be correlated because 1150×1.5>1160 and 1150<1160×1.5 hold. The pair of sub-periods M(7) is determined to be correlated because, using the absolute values of the respective areas, 1900×1.5>1890 and 1900<1890×1.5 hold. As described above, since the areas have been determined to be correlated with respect to all the pairs, that is, the pair of sub-periods P(5) and the pair of sub-periods M(7), it is determined that, in total, there is a correlation. This evaluation, however, does not have to be performed every time a sensor signal value is acquired. Performing the evaluation only at turning points of signs of evaluation data values enables not only the amount of processing to be reduced but also a determination result to be issued in a timely manner when user motions are finished.

Figure 7:
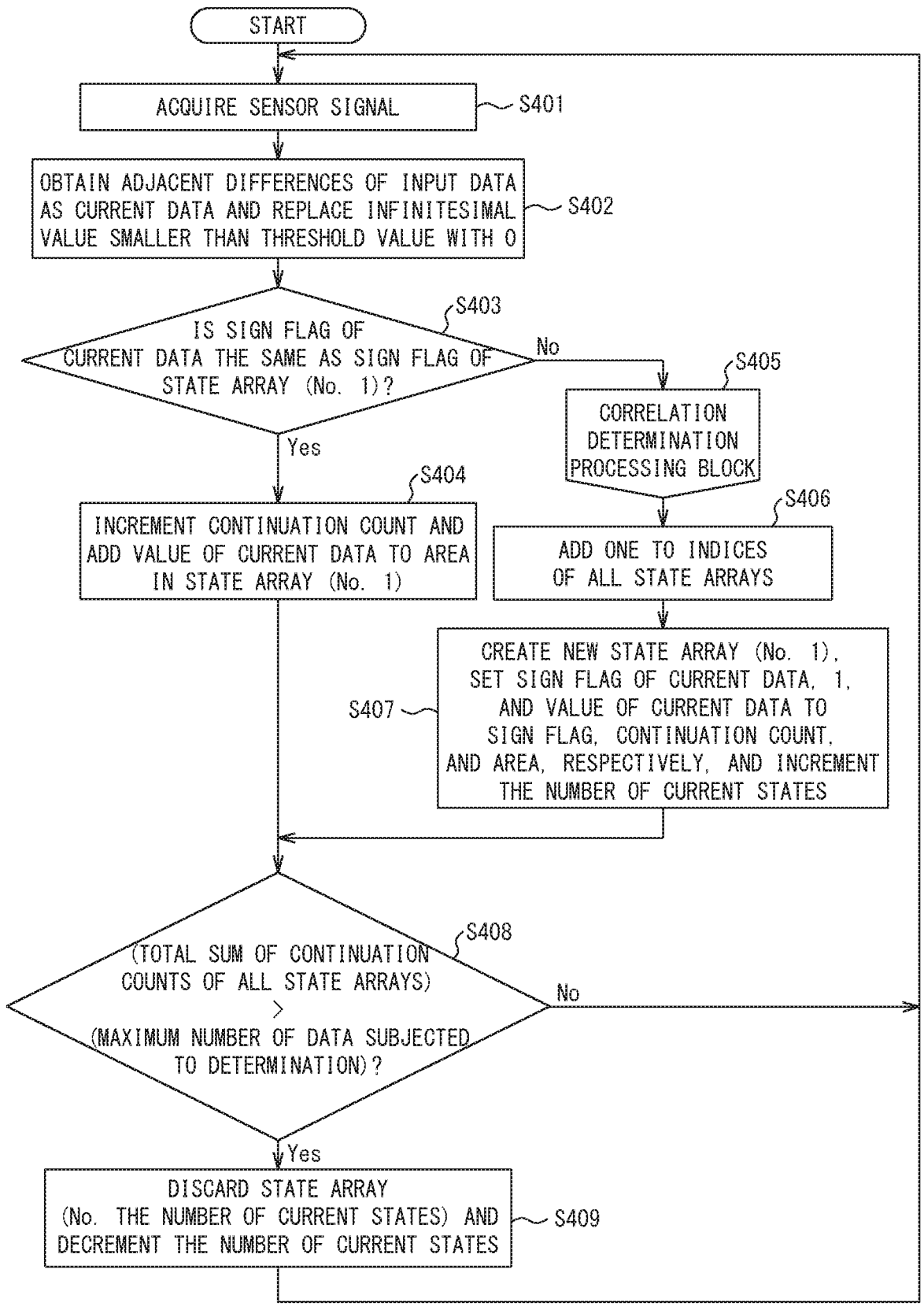
FIG. 7 is a diagram for a description of the second exemplary embodiment of the present invention and a flowchart illustrative of an example of a flow of a waveform comparison method using sign patterns and areas in a waveform comparison unit 102.

FIG. 7 is a flowchart for a description of an example of a waveform comparison method described above using the sign patterns and areas in the waveform comparison unit 102.

The following terms will now be defined.

State array (No.) (sign flag) (continuation count) (area)

No.: the current value is 1. A larger number is assigned in a sequential order as going back to the past.

Sign flag: a positive value, a negative value, and an infinitesimal value, which is close to zero, are denoted by P, M, and Z, respectively.

Continuation count: the number of consecutive pieces of evaluation data that have the same sign flag.

Area: the total sum of the values of consecutive pieces of evaluation data that have the same sign flag.

Initially, only a state array (No. 1) (flag Z) (continuation count 2000) (area 0), which indicates that a state of having no motion has continued for 100 sec, exists. In the definition, the "sign flag", the "continuation count", and the "area" are equivalent to sign information, an period length representing the number of pieces of evaluation data belonging to a sub-period, and an area representing the total sum of the values of pieces of evaluation data belonging to the sub-period or the total sum of the absolute values of the values of pieces of evaluation data belonging to the sub-period, respectively.

The current number of states is the number of the above-described state arrays that are effective at a current moment. The initial value is 1.

The number of correlating states is the number of state arrays of a waveform during one period for which the correlations are evaluated.

For example, a sequence of state arrays below is determined to have a correlation between waveforms with the number of correlating states being equal to 3.

state array (No. 1) (flag P) (continuation count 5) (area 200)

state array (No. 2) (flag Z) (continuation count 3) (area 0)

state array (No. 3) (flag M) (continuation count 7) (area −300)

state array (No. 4) (flag P) (continuation count 5) (area 200)

state array (No. 5) (flag Z) (continuation count 3) (area 0)

state array (No. 6) (flag M) (continuation count 7) (area −300)

The maximum number of pieces of data subjected to determination is a maximum value of motion time during which a user is able to repeat a motion, which is expressed in the number of pieces of data.

For example, for a case in which performing a cycle of motion takes 5 sec, sampling is performed at 20 Hz, and the number of repeats of the motion is 3, the maximum number of pieces of data subjected to determination is calculated as "5×20×3=300".

In step S401, a sensor signal is acquired at a fixed time interval by a sensor of a sensor signal acquisition unit 101.

In step S402 succeeding step S401, a piece of current data is obtained by subtracting, from the acquired sensor signal value, a sensor signal value acquired at the previous sampling time. A preset threshold value or a threshold value automatically adjusted in accordance with the magnitude of an acquired sensor signal is defined and, when the absolute value of the piece of current data is lower than the threshold value, the piece of current data is replaced with 0.

In step S403 succeeding step S402, whether or not the sign flag of the piece of current data is the same as the sign flag in the state array (No. 1) is determined, and, if being the same, the process proceeds to step S404, and, if not being the same, the process proceeds to step S405.

In step S404, 1 is added to the continuation count in the state array (No. 1), and the value of the piece of current data is added to the area in the state array (No. 1).

Figure 8:
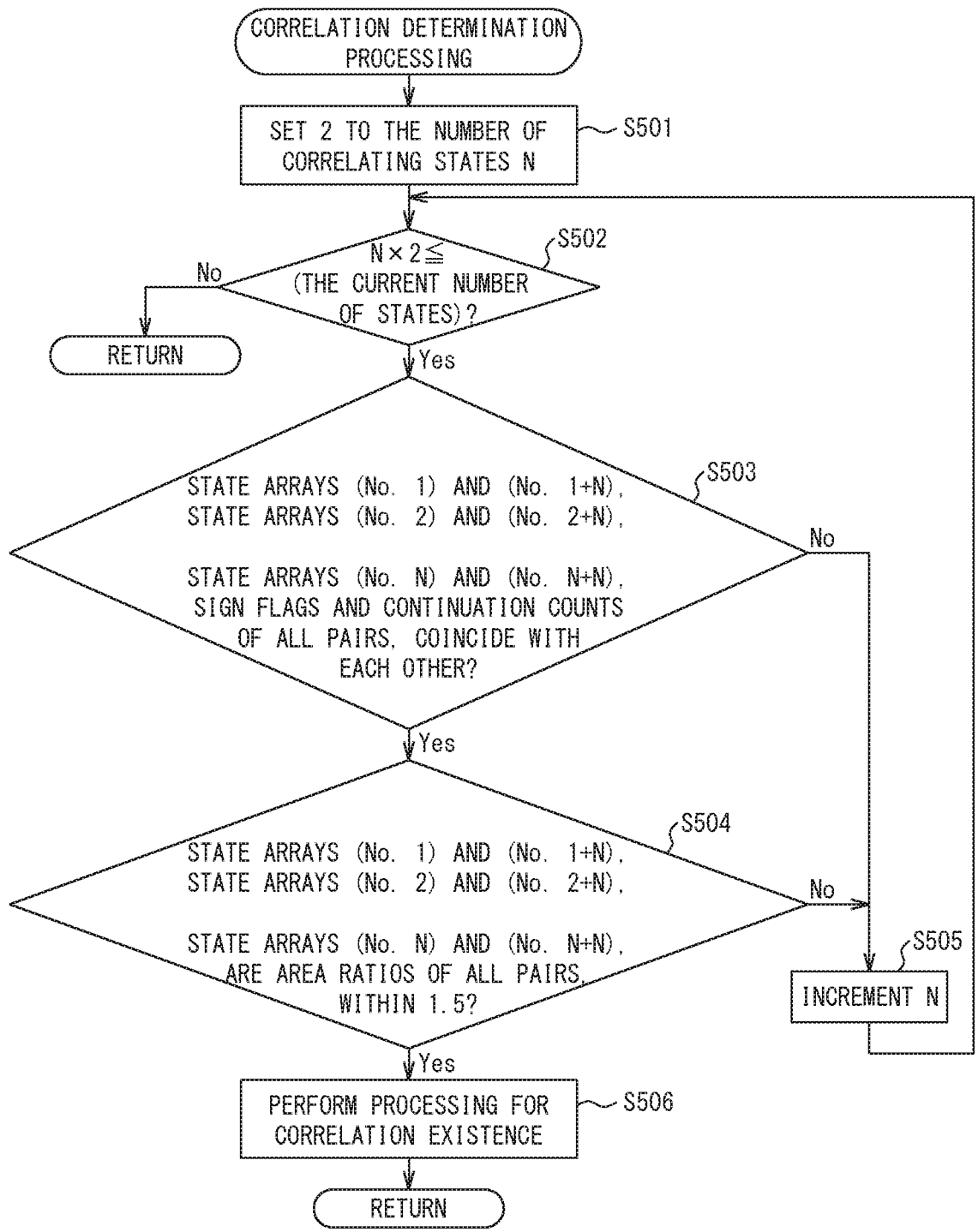
FIG. 8 is a diagram for a description of the second exemplary embodiment of the present invention and a flowchart illustrative of an example of a flow of a correlation determination processing.

In step S405, correlation determination processing, which will be described later using FIG. 8, is performed.

In step S406 succeeding step S405, to change the state array (No. 1) into an unused array in preparation for creating a new state array (No. 1) in the succeeding step, the index numbers of the state arrays are shifted by one by adding 1 to the index numbers No. of all the state arrays.

In step S407 succeeding step S406, a state array (No. 1) is newly created, and the sign flag of the piece of current data, a value of 1, and the value of the piece of current data are set to the sign flag, the continuation count, and the area, respectively, of the newly created state array (No. 1). The current number of states is incremented by one because the number of state arrays has increased by one.

In step S408 succeeding step S404 or step S407, to determine whether or not the amount of stored data has exceeded an upper limit, the total sum of the continuation counts of all the state arrays is obtained and compared with the maximum number of pieces of data subjected to determination. If the obtained total sum is larger than the maximum number of pieces of data subjected to determination, the process proceeds to step S409, and, if the obtained total sum is equal to or smaller than the maximum number of pieces of data subjected to determination, the process returns to step S401.

In step S409, the state array (No. the current number of states), which is the oldest state array, is discarded, and, since the number of state arrays has decreased by one because of the discard, the current number of states is decremented by one.

Subsequently, a correlation determination processing block in FIG. 8 will be described.

In step S501, for the purpose of determining in every how many state arrays a correlation appears, 2 is set to the number of correlating states N to set the initial value at 2, which is the minimum number among the possible numbers of state arrays for a correlation to appear. A new state array is created every time the sign flag changes. Thus, adjacent state arrays always have different sign flags. Since state arrays having different sign flags means that there is no correlation therebetween, a case of a correlation appearing in every single state array is not subjected to evaluation, which allows the initial value to be set at 2.

In step S502 succeeding step S501, to determine whether or not the state arrays have been sufficiently subjected to evaluation, if a value twice the number of correlating states N is not more than the current number of states, the process proceeds to step S503, and, otherwise, the process returns to step S406.

In step S503 succeeding step S502, whether or not two periods for which comparison is performed have a correlation therebetween in terms of a sign pattern (sign flag and continuation count) is determined. More specifically, whether or not the sign flags and the continuation counts of all pairs of state arrays, that is, the state arrays (No. 1) and (No. 1+N), the state arrays (No. 2) and (No. 2+N), . . . , and the state arrays (No. N) and (No. N+N), coincide with each other is determined. If they coincide with each other, the process proceeds to step S504, and, if not, the process proceeds to step S505. It is possible to devise a measure of, under the condition that the total sums of the continuation counts in respective ones of two periods for which comparison is performed substantially coincide with each other, allowing a difference between the continuation counts of corresponding state arrays up to plus and minus one to take into account a rhythmical sense and a degree of mastery with respect to each user and loosen the accuracy of a repetitive motion when sampling is performed at a high sampling frequency. For example, with regard to a sequence "P(5)Z(3)M(7)P(6)Z(4)M(6)", since the total sums of the continuation counts are calculated as 5+3+7=15 and 6+4+6=16, the difference between which is 1, the total sums are determined to substantially coincide with each other, and, since differences in the continuation counts between respective corresponding state arrays "P(5)–P(6), Z(3)–Z(4), and M(7)–M(6)" are plus one and minus one, it is determined that there is a correlation in the sequence as a whole. Although an example in which the difference between the total sums of continuation counts is 1 was described above, since, as illustrated in FIG. 3, "Middle" motion time is one and a half times as long as "Short" motion time, it is suitable to set the difference between the total sums of continuation counts within 25 percent of the larger one of the total sums of continuation counts to discriminate the two types of motion time from each other.

In step S504, to determine whether or not two periods for which comparison is performed have a correlation therebetween in terms of the area, whether or not area ratios (ratio obtainable by dividing the larger one by the smaller one) of all pairs of state arrays, that is, the state arrays (No. 1) and (No. 1+N), the state arrays (No. 2) and (No. 2+N), . . . , and the state arrays (No. N) and (No. N+N), are not more than 1.5 is determined. If they are not more than 1.5, the process proceeds to step S506, and, if not, the process proceeds to step S505.

In step S505, to increase the number of state arrays to be compared by one, the number of correlating states N is incremented by one.

In step S506, predetermined mode setting processing for the case in which it is determined that there is a correlation is performed, and, subsequently, the process returns to step S406. Since the total sum of the continuation counts of the state arrays (No. 1) to (No. N) is equivalent to motion time, it is possible to perform determination on the basis of the value and use a determination result for mode setting of the afore-described music player.

For example, when a user, in calling up an address book retrieval application through motions with a repeat count of 2 to make a phone call to a friend during driving a car, wants to cancel the motions because something comes to his/her mind in the middle of the motions, it is convenient for the user to be able to cancel the motions by appending an additional repetitive motion. When whether or not a motion having been performed is the third repetition is determined, the afore-described number of correlating states N is fixed, and the sign flags, the continuation counts, the area ratios of the state arrays (No. 1) to (No. N) and the state arrays (No. N+N+1) to (No. N+N+N) are evaluated. Processing for, when it is determined that the third repetitive motion has been performed, canceling mode setting executed at the recently performed second motion can be implemented.

In the above-described waveform comparison method using sign patterns and areas, further appending a state of no motion to the end of a cycle of motion enables providing a method for increasing variations of motion for users who are not good at performing rapid movements.

For example, instantly performing opening a hand immediately after having performed "opening, closing, and resting" the hand and "opening, closing, and resting" the hand enables the system to detect a turning point of the sign flag.

For example, in a rhythm expressed by "tan tan ta ta, tan tan ta ta" or "P (6)M(6)P(3)M(3)P(6)M(6)P (3)M(3)", which is illustrated by a sequence of notes "a quarter note, a quarter note, an eighth note, an eighth note, a quarter note, a quarter note, an eighth note, an eighth note" in the upper row in FIG. 2B, some users are not good at performing rapid movements expressed by "ta ta" or "P (3)M (3)". In this case, as illustrated by "quarter note, quarter note, a quarter rest, quarter note, quarter note, a quarter rest" in the lower row in FIG. 2B, using a rhythm expressed by "tan tan_, tan tan_" or "P(6)M(6)Z(6)P(6)M(6)Z(6)", that is, appending a state of no motion to the end of a cycle of motion, provides an advantage that it is possible to make such users perform cycles of motion of the same length. In the above expression, "_" indicates a state of no motion.

A method of prepending a state of no motion to the beginning of a cycle of motion may also be employed in a similar manner.

Third Exemplary Embodiment

An example of implementing the present invention to a skin conductivity sensor (an example of a sensor attached to a living body), which is attached to a wrist, will be described. Since a configuration of hardware except the sensor and a configuration of functional blocks are the same as those of the first exemplary embodiment, a description thereof will be omitted. In the exemplary embodiment, a signal sampled by a sensor attached to a living body is used as a sensor signal.

Figure 9A:
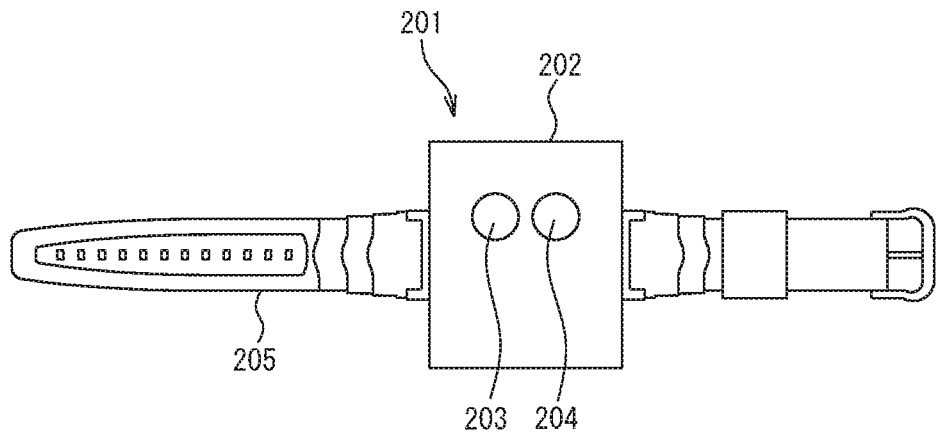
FIGS. 9A and 9B are diagrams for a description of a third exemplary embodiment of the present invention and an external view of a skin conductivity sensor.
Figure 9B:
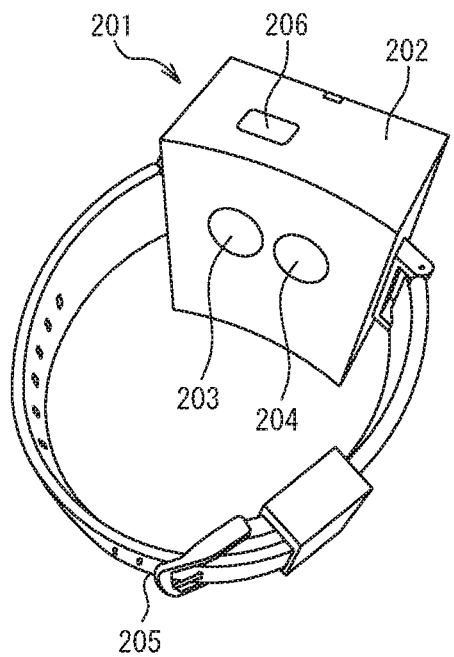
Figure 10:
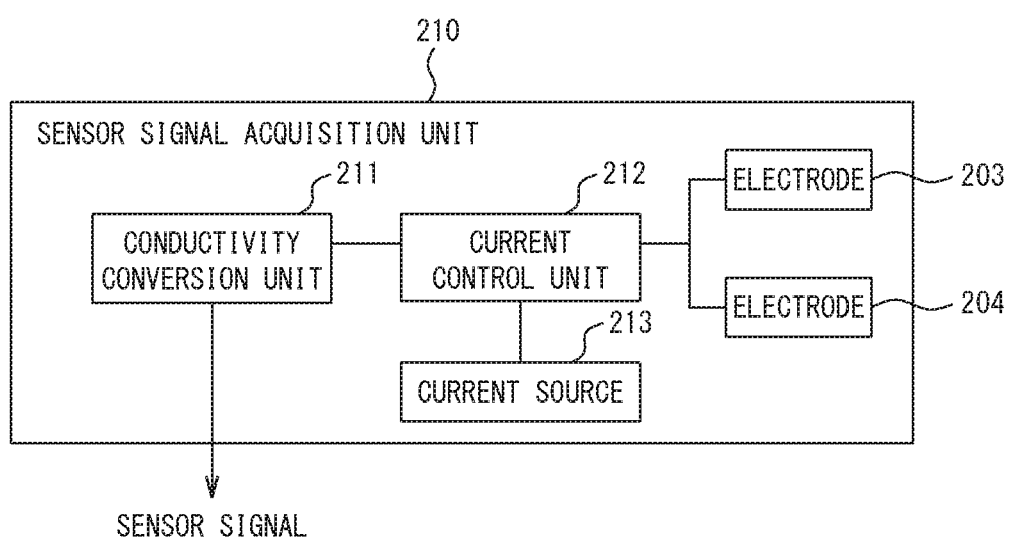
FIG. 10 is a diagram for a description of the third exemplary embodiment of the present invention and a functional block diagram illustrative of a sensor signal acquisition unit included in a skin conductivity sensor.

FIGS. 9A and 9B illustrate an external view of a skin conductivity sensor, which is a type of biosensor, and FIG. 10 is a functional block diagram illustrative of a sensor signal acquisition unit included in the skin conductivity sensor. FIG. 9A illustrates a skin conductivity sensor 201 viewed from the side on which the skin conductivity sensor 201 comes into contact with skin of a person, and FIG. 9B illustrates the skin conductivity sensor 201 in a condition of being attached to a person.

As illustrated in FIGS. 9A and 9B, the skin conductivity sensor 201 includes a box unit 202 that contains a microcomputer and a battery, two electrodes 203 and 204 that are stuck to skin of a person, and an attachment belt 205 that is wound around an arm of the person in attaching the skin conductivity sensor 201. As illustrated in FIG. 9B, a power switch is provided on a side face of the box unit 202.

As illustrated in FIG. 10, a sensor signal acquisition unit 210 implemented in the box unit 202 includes a current source 213, a current control unit 212 that controls current quantity from the current source 213, the two electrodes 203 and 204 that are connected to the current control unit 212, and a conductivity conversion unit 211 that converts a current flowing between the two electrodes 203 and 204 into conductivity.

The skin conductivity sensor 201 is a sensor that, with the two electrodes 203 and 204 being stuck to skin of a person, applies a weak voltage between the electrodes 203 and 204, converts a current flowing between the electrodes into conductivity, and monitors the conductivity. Skin conductivity of human skin changes because of sweating. The primary use of the skin conductivity sensor 201 is to, by monitoring changes in the skin conductivity due to sweating on a palm or wrist caused by an action of a sympathetic nervous system, detect an occurrence of an emotion that has caused the excitement of the sympathetic nervous system. However, the skin conductivity sensor 201 also responds to a change in a contact state between the two electrodes 203 and 204 and skin. When the skin conductivity sensor 201 is attached to a wrist, only moving a finger, bending the wrist, and twisting the wrist make the contact state change. Although, usually, a detection signal based on such motions is eliminated because it is considered as noise, the present invention uses the detection signal for detection of whether or not the user has repeated the same motion rhythmically.

FIGS. 11A and 11B are graph of adjacent differences, referred to as "Skin Conductance Response (SCR)", of a signal from a skin electrical resistance sensor. FIG. 11A is a graph originating in an emotion having arisen during video watching, and FIG. 11B is a graph of motion artifacts caused by bending and stretching fingers. Performing analysis using the afore-described correlation coefficient and sign information enables the same motion having been repeated rhythmically to be detected in FIG. 11B.

A first advantage of the implementation is a feature that motions performed by one hand can be detected even when a user thrusts the hand into his/her pocket or wears a glove on the hand. A motion of moving fingers from the forefinger to the little finger together in performing "beckoning", which is one of modes of motion in inviting a person, can be performed even with a mitten worn on the hand. Although, in a scene in which a user is listening music using a portable music player in midwinter, the user is forced to remove his/her hand from his/her pocket and take off his/her glove when manipulating the portable musing player that uses a conventional technology in which the user operates a switch provided on an earphone, the skin conductivity sensor 201 of the present invention, which is attached to a wrist, eliminates such actions.

A second advantage of the implementation is a feature that the skin conductivity sensor 201 attached to a wrist is capable of detecting even a small motion that an acceleration sensor attached to the same wrist is unable to detect. To put it the other way around, a similar rhythmical motion detected by an acceleration sensor attached to the same wrist can be excluded as noise. It is possible to use the afore-described motion of moving fingers for mode setting and neglect a rhythmical signal detected when a user is dancing or walking swinging his/her arms as noise.

A third advantage of the implementation is a feature that false recognition caused by a preliminary motion before a gesture to be recognized can be reduced. For example, when a motion of opening and closing a hand is to be repeated, motion pattern is not required to be registered in advance in the present invention. Thus, a user may perform "closing and opening, and closing and opening" his/her hand in the case of starting the motion with his/her hand opened and perform "opening and closing, and opening and closing" his/her hand in the case of starting the motion with his/her hand closed. Since a preliminary motion itself is eliminated, a fault that a preliminary motion causes false recognition may be reduced. When the present invention is applied to a case in which a user is holding a steering wheel of a car and performs "opening and closing, and opening and closing" his/her hand, no preliminary motion is required and the user is brought back again to a state of holding the steering wheel at the end of the motion, and it can thus be said that the present invention is an excellent method from the viewpoint of safety.

An advantage of setting no threshold value in an example of the skin conductivity sensor 201 will be described.

The skin conductivity sensor 201 is capable of sensing changes in a contact state between skin and the electrodes 203 and 204, which are generated by repeats of a bulge and a depression of a muscle on the inner side of a wrist because of opening and closing motions of a hand. Since, on a user having low subcutaneous fat, a depression of a muscle causes skin and the electrodes 203 and 204 to be separated from each other and skin conductivity thus becomes almost zero, setting a threshold value enables a sensor signal to be distinguished from noise. However, on a user having a lot of subcutaneous fat, skin and the electrodes 203 and 204 do not separate from each other, and skin conductivity only changes gradually and never becomes zero. Thus, the present invention determines whether or not detected changes indicate an intentional motion by a user not on the basis of whether or not skin conductivity exceeds a threshold value but on the basis of whether or not a situation in which a signal gradually changes is repeated cyclically.

The present invention enables not only users having a lot of subcutaneous fat to be relieved from the drawback described above but also a motion of stretching skin on the inner side of a wrist by bending the wrist toward the back of the hand to be coped with and further a minute motion of only clenching and loosening the first to be coped with.

Although the exemplary embodiment was described using information on skin conductivity, that is, skin electrical resistance, as an example of biological information, information on any of a heartbeat, pulse wave, blood pressure, a blood oxygen level, body temperature, respiration, brain waves, blinks, and the number of steps may also be used as biological information.

Fourth Exemplary Embodiment

Figure 12:
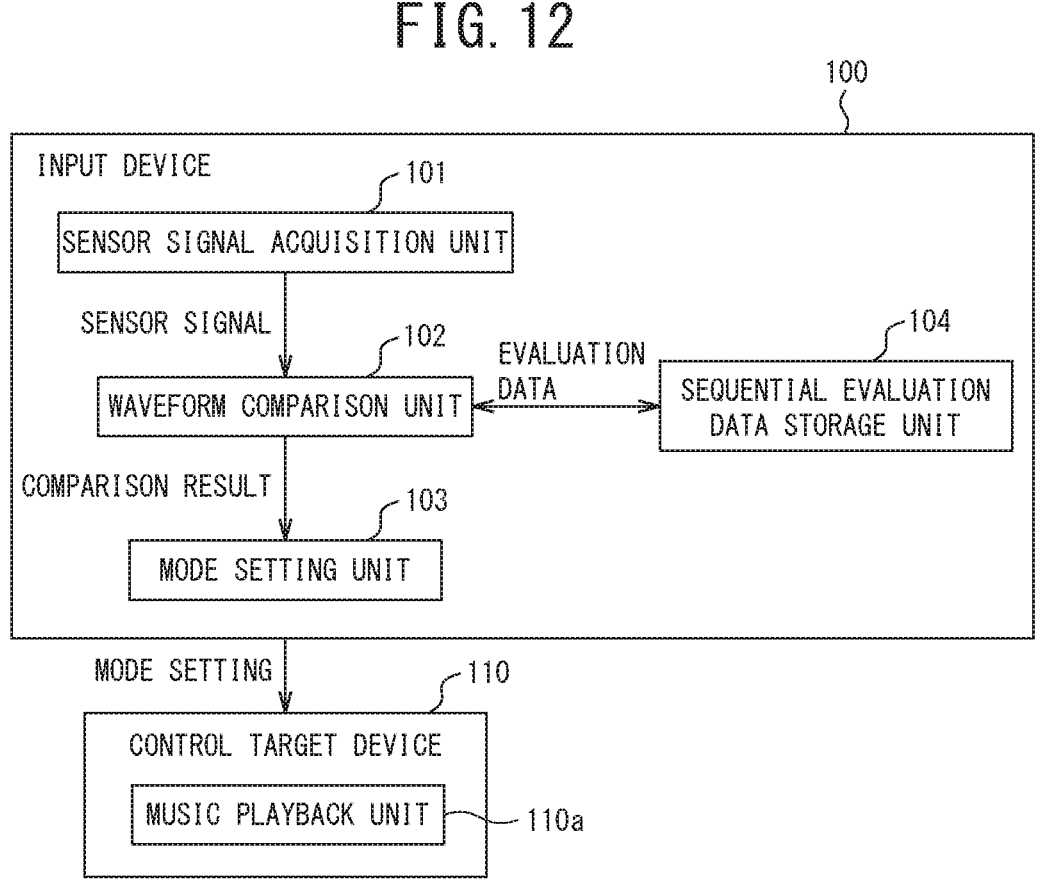
FIG. 12 is a functional block diagram illustrative of an input device according to a fourth exemplary embodiment of the present invention.

A relation between the present invention and music play-back will be described. As illustrated in FIG. 12, since, in the exemplary embodiment, configurations of hardware and functional blocks of an input device are the same as those of the first exemplary embodiment, except for a music playback unit 110*a* that is provided with a music playback function and a feature that a music information acquisition function is incorporated in a control target device 110, a detailed description will be omitted. A mode setting unit 103 in the exemplary embodiment is configured to convert the time length of waveforms during two or more periods that are determined to be substantially identical waveforms into a tempo, and, when the tempo and the tempo of a piece of music being played back by the music playback unit 110*a* are compared with each other and determined to be correlated, discard the determination that the waveforms are substantially identical.

When an input signal is considered to be waveforms of two successive cycles, there is a possibility that, in actuality, a user is only dancing to music and has not performed a motion with the intention of input. To confirm whether or not the signal indicates an intentional motion, the mode setting unit 103 acquires information on music playback (tempo of a piece of music being played back by the music playback unit 110*a*) from the control target device 110, converts the length of time (time length) of waveforms in the input signal that are considered to be waveforms of two successive cycles (waveforms during two or more periods) into a tempo, and determines whether or not the converted tempo and the tempo of the piece of music being played back coincide with each other or either one is an integral multiple of the other. When the determination results that two tempos coincide with each other, that is, there is a correlation, the mode setting unit 103 determines the waveforms to have been generated by dancing by the user, discards the waveforms considered to be waveforms of two successive cycles, and does not set a mode.

While, in the exemplary embodiment, a determination method in the mode setting unit 103 was described, the mode setting unit 103 may provide, to the control target device 110, information on the length of waveforms in an input signal that are considered to be waveforms of two successive cycles. The control target device 110 calculates a tempo based on the provided length of waveforms and compares the calculated tempo with the tempo of a piece of music being played back by the device itself.

Alternatively, the control target device 110 may be provided with a microphone instead of a music playback function, detect the tempo of music in an external environment from an input voice signal, and compares the detected tempo with the tempo calculated from the length of waveforms provided by the mode setting unit 103. This configuration enables malfunctions occurring in a karaoke room to be reduced.

Next, an implementation in which, if a detected motion is a pre-registered motion, mode setting is performed without discarding waveforms even when tempos coincide with each other will be described. Taking notice that a user is able to easily reproduce a motion performed in the past accurately if a piece of music with the same tempo is played back, the exemplary embodiment devises a conventional method of registering motions in advance so as to use music in the registration of motions.

At the time of registration, a user is requested to perform a motion that the user himself/herself has chosen while a piece of music is played back, and the motion pattern, the tempo of the played-back piece of music, and a mode setting method are registered. At the time of mode setting, a user motion is waited to be received while a piece of music is played back, and, when sensed waveforms are detected to be waveforms of two successive cycles, whether or not the tempo of the waveforms coincides with the tempo of the piece of music being played back is determined. If the tempo of the waveforms coincides with the tempo of the piece of music being played back, whether or not the waveforms have a correlation with the waveforms of the pre-registered motion pattern is determined, and, if it is determined that there is a correlation, mode setting is performed in accordance with the pre-registered mode setting method.

When two or more periods of waveforms to be compared are not adjacent to each other on the time axis and the input device 100 is used in conditions in which pieces of music are played back during the two or more periods, a waveform comparison unit 102 is configured to, when the tempos of the pieces of music to be played back during the two or more periods differ from each other, edit information of waveforms in accordance with a difference between the tempos of the pieces of music played back to synchronize the time length of the two periods for which comparison is performed.

For example, when two periods at the times of registration and mode setting are not adjacent to each other on the time axis and pieces of music to be played back at the times of registration and mode setting are different from each other, the length of a registered motion is expanded or contracted in accordance with a ratio between the tempo of the piece of music played back at the time of registration and the tempo of the piece of music played back at the time of mode setting. The expansion and contraction can be achieved using a not-illustrated sampling rate converter in the first exemplary embodiment in which a correlation coefficient is used. For example, with regard to a skin conductivity sensor that samples data at 20 Hz, when the tempo of a piece of music having been played back at the time of registration is "quarter note at 40" and the tempo of a piece of music played back at the time of mode setting is "quarter note at 80", sampling data sampled at the time of mode setting is up-sampled into data sampled at 40 Hz using the sampling rate converter and compared with sampling data sampled at the time of registration. The expansion and contraction can also be achieved by increasing or decreasing continuation counts used in step S503 or area ratios used in step S504 in the correlation determination processing block in the second exemplary embodiment.

In addition to the example in which a registered motion pattern is repeated twice, an application example in which, immediately after a not-registered motion for activating a mode setting function has been repeated twice, a registered motion pattern for identifying a mode is performed once is also included in the scope of the present invention.

The present invention enables a phone call to be made to a specific person and a redialing function and a call-back function to be called by only a hand motion while driving a car with music being played back. For example, to call a function for making a phone call, the following process is carried out. It is assumed that repeating the same not-registered motion twice causes an address book retrieval application to be activated. A motion easy to learn is suitable for specifying a person to whom a phone call is to be made, and a user registers, as motion patterns, motions of writing a letter in the air, such as writing a letter Y in the alphabet to make a phone call to Yamashita-san and writing a letter O in the alphabet to make a phone call to Okamoto-san, in advance. By performing a motion of actually writing a letter in the alphabet while playing back music, the user registers a motion pattern, a tempo, and a function. When the user makes a phone call to Yamashita-san, the user opens and closes his/her hand twice and, subsequently, writes a letter Y in the air to a piece of music being played back. The system detects a portion of evaluation data in which the user opened and closed his/her hand twice as motions of two successive cycles and determines that the detected motions coincide with a motion pattern for activating an address book retrieval application. Subsequently, the system, while successively acquiring evaluation data that succeed the portion of evaluation data in which the user opened and closed his/her hand twice and expanding and contracting a registered motion pattern based on the tempo of a piece of music being played back and the registered tempos, repeats a comparison with a registered motion pattern for a phone number. Subsequently, the system, at the timing when the user has finished writing a letter Y, determines that a detected motion coincides with the registered motion pattern of writing a letter Y for Yamashita-san and makes a phone call to Yamashita-san. Two or more sensors may be used in combination, and, in the above-described case, it is suitable to detect opening and closing of a hand by a skin conductivity sensor and detect a motion of writing a letter in the alphabet by an acceleration sensor.

Although, in usual gesture recognition, to absorb fluctuation in user motion time, a hidden Markov model or a dynamic time warping method is used, there has been a problem of these methods requiring a large quantity of calculation. In the present invention, playing back music enables user motion time to be kept constant and an algorism with a small quantity of calculation to be applied.

Fifth Exemplary Embodiment

In a biosensor which a wearable-type device, which is attached to various regions of a living body, such as a wrist, an arm, a finger, the head, an ear, the waist, the abdomen, and the chest, is equipped with, fluctuation of a sensor signal that is derived from motions of a wearer occurs in addition to primary fluctuation of a sensor signal that is derived from a biological response.

One of the important viewpoints of the present invention is a capability of detecting fluctuation of a sensor signal that is derived from an intentional motion of a wearer out of fluctuation of the sensor signal that is derived from motions of the wearer without impeding the original function of a biosensor for detecting biological information from fluctuation of the sensor signal that is derived from a biological response.

Recent years, various types of wearable-type devices, such as a wristband-type (wristwatch-type) device, a glasses-type device, and a ring-type device, have been developed. Such a wearable-type device is used for a purpose of acquiring and displaying various information in cooperation with a mobile information terminal, such as a portable telephone device and a smartphone. In particular, a wearable-type device is used for the purpose of detecting biological information of a wearer, carrying out various information processing and information management, and grasping and further controlling amount of activity, a health condition, and an emotional condition of the wearer by the wearer viewing such information and the system issuing various alerts.

Biological information subjected to detection by biosensors includes various information, such as a heartbeat, heart sound, pulse wave, blood pressure, a blood oxygen level, body temperature, respiration, skin conductivity, skin potential, brain waves, blinks, and the number of steps. Many of such biosensors acquire a sensor signal by coming into contact with skin directly or indirectly to measure electrical resistance and capacitance of skin or irradiating a measurement target with light, electromagnetic waves, and ultrasonic waves to measure reflection and absorption thereof and analyze the acquired sensor signal.

In the measurement methods described above, fluctuation is generated on a sensor signal by not only a biological response of a wearer, to whom a wearable-type device equipped with a biosensor is attached, but also motions of the wearer. Fluctuation is generated on a sensor signal not only directly by the wearer moving a sensor-attached region but also, in the case of, for example, a skin conductivity sensor attached to a wrist, indirectly by deep respiration of the wearer.

The skin conductivity sensor illustrated in FIG. 11 has achieved a function for detecting an intentional motion additionally with the original emotion detection function maintained by means of detecting a waveform derived from a cyclic motion that the wearer intentionally performs through the utilization of a characteristic that a waveform derived from emotion does not have periodicity.

Figure 13A:
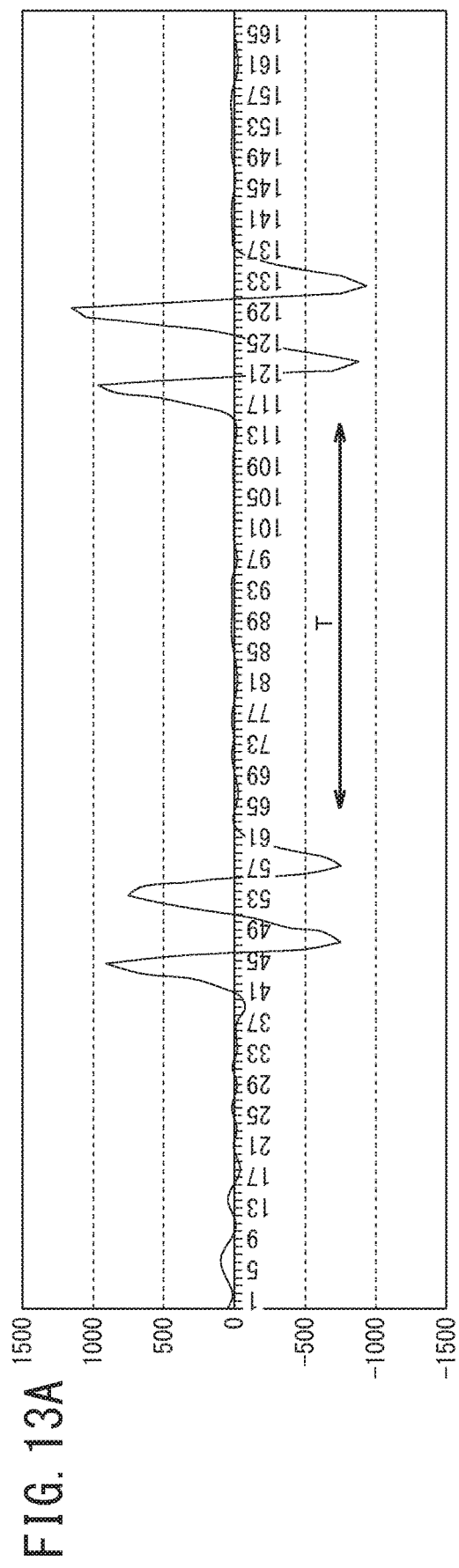
FIGS. 13A and 13B are diagrams for a description of a fifth exemplary embodiment of the present invention and illustrative of an example of a detected waveform sensed by a pulse wave sensor attached to a wrist.
Figure 13B:
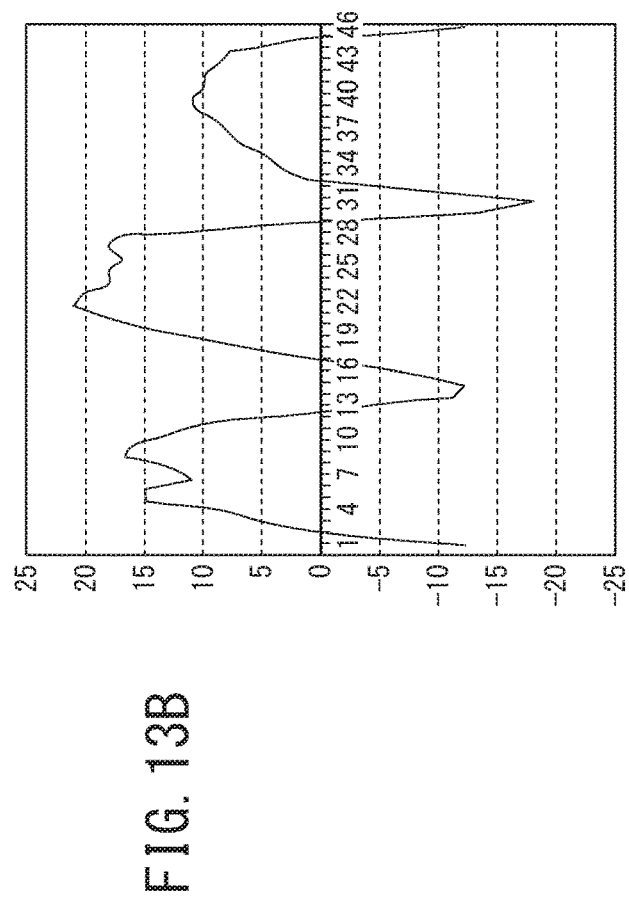

FIGS. 13A and 13B are diagrams illustrative of an example of a detected waveform in a pulse wave sensor attached to a wrist. FIG. 13A illustrates a detected waveform of a cyclic motion of bending and stretching fingers, and FIG. 13B illustrates a partial period within a period T in FIG. 13A with the ordinate magnified 60 times.

In the pulse wave sensor illustrated in FIGS. 13A and 13B, while a pulse wave itself exhibits a cyclic waveform, waveforms derived from cyclic motions that the wearer performs intentionally exhibit a maximum amplitude as large as 50 to 100 times of that of the pulse wave. Thus, setting a threshold value for the absolute values of evaluation data and rounding the amplitude of the pulse wave to zero enable waveforms generated by cyclic motions that the wearer has performed intentionally to be detected. Conversely, neglecting a period during which the amplitude exceeds the threshold value with margins added therebefore and thereafter enables a pulse wave to be detected from the other periods.

As described above, a sensor signal generated by cyclic motions that are performed intentionally can be, on the basis of periodicity and the magnitude of amplitude of fluctuation thereof, treated separately from fluctuation of a sensor signal that is derived from a biological response, and the periodicity can be determined using the method in the present invention.

The present invention enables a biosensor which a wearable-type device is equipped with to be used as an input device for performing mode setting that a user intends by detecting even fluctuation of a sensor signal generated by cyclic motions that the user performs intentionally without impeding the primary function of the biosensor for detecting biological information.

Figure 14:
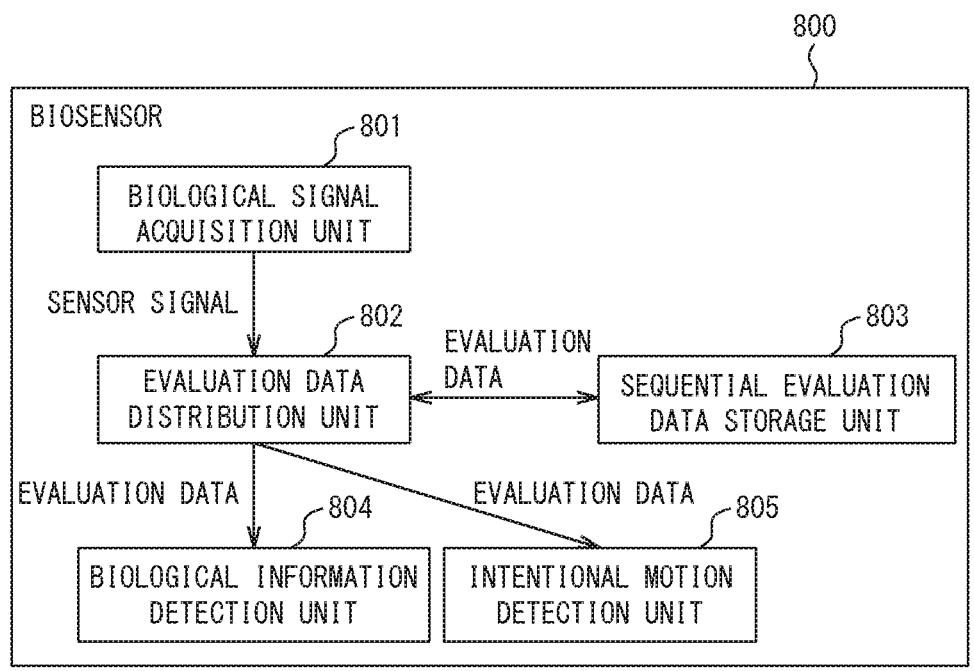
FIG. 14 is a diagram for a description of the fifth exemplary embodiment of the present invention and a functional block diagram illustrative of a biosensor 800.

FIG. 14 is a functional block diagram illustrative of a biosensor 800. The biosensor 800 includes a biological signal acquisition unit 801 that acquires a sensor signal sampled by a sensor configured to be attached to a living body, a sequential evaluation data storage unit 803 that stores evaluation data that are the sensor signal or data obtained by processing the sensor signal using a predetermined processing method, a biological information detection unit 804 that detects biological information from the evaluation data, an intentional motion detection unit 805 that detects a cyclic motion from the evaluation data in accordance with the present invention, and an evaluation data distribution unit 802 that, while, if required, setting a threshold value and processing the evaluation data, distributes the evaluation data to the biological information detection unit 804 and the intentional motion detection unit 805 depending on information to be detected.

By this configuration, only adding an appropriate signal processing step for a sensor signal that the biosensor acquires without arranging a dedicated sensor for the purpose of detection of a motion intended for mode setting can achieve an input device for, while performing biological information detection, which is the primary function of the biosensor, detecting a motion intended for mode setting and performing device operation, information input, and the like.

Although the above description was made using two examples in which a skin conductivity sensor and a pulse wave sensor are used individually, it is apparent that, in biosensors, including other existing biosensors or biosensors to be developed in the future, that use the afore-described measurement method, using the method in the present invention enables fluctuation of a sensor signal generated by cyclic motions that a user performs intentionally to be detected without impeding the primary function for detecting biological information.

With regard to a sensor for measuring infrared rays derived from body temperature of a living body, there is a case in which the sensor is used without being attached to the living body, as in, for example, a user absence detection system for a personal computer. The present invention is applicable to an application that determines whether or not to lock a personal computer when the personal computer is in a power saving mode depending on whether or not a user has performed cyclic motions before absenting himself/herself from the personal computer and sets a result to the personal computer. The present invention is also applicable to an infrared sensor, in a smartphone, that is arranged close to the speaker for the purpose of reducing occurrences of unwanted operations caused by the face of a user coming into contact with an operation surface. In this case, a signal sampled by the infrared sensor (sampling signal) is used as a sensor signal. The present invention is applicable to, for example, an application in which, when a piece of music is played back with a smartphone placed on a docking station for music playback, holding a hand in front of the infrared sensor and performing motions rhythmically, without picking up the smartphone, causes the mode setting described in Table 1 to be done.

Sixth Exemplary Embodiment

An example in which the present invention is applied to an infrared sensor that responds to body temperature of a living body will be described. Since a configuration of hardware except a sensor and a configuration of functional blocks are the same as those of the first exemplary embodiment, a description thereof will be omitted. In the exemplary embodiment, a signal sampled by the infrared sensor (sampling signal) is used as a sensor signal. A change in a positional relation between a hand, which is a portion of a living body, and the infrared sensor is to be detected.

Figure 15:
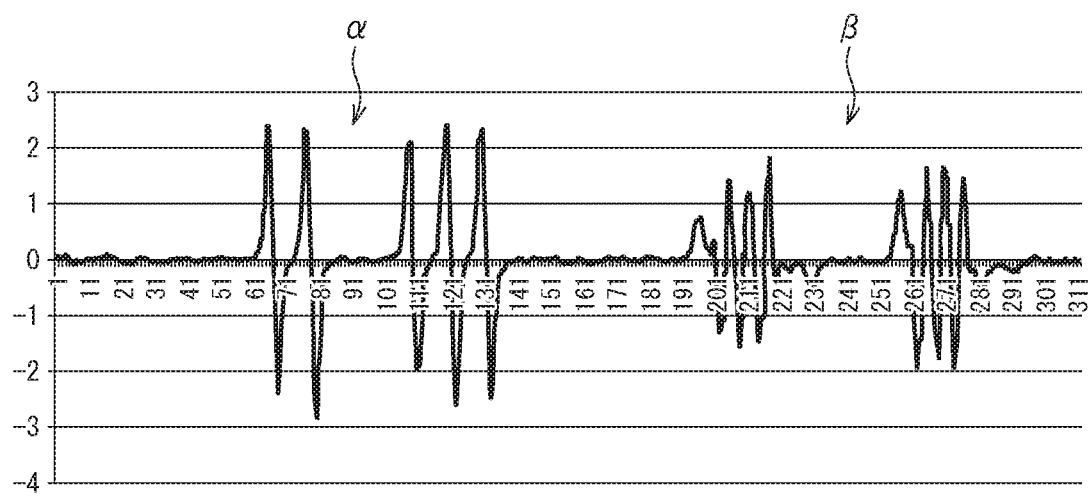
FIG. 15 is a diagram for a description of a sixth exemplary embodiment of the present invention and illustrative of a graph of a signal collected by an infrared sensor when a hand is moved.

FIG. 15 is graphs illustrative of a signal generated when a hand is brought close to and away from the infrared sensor and a signal generated when, after a hand has been brought close to the infrared sensor, the hand is waved quickly. A signal waveform α in FIG. 15 is a waveform generated when a hand is brought close to and away from the sensor slowly. A signal waveform β in FIG. 15 is a waveform generated when a motion of, after bringing a hand close to the sensor, waving the hand quickly in front of the sensor is performed. The graphs exhibit that, when a user performs cyclic motions, an input signal from the infrared sensor is considered to be waveforms of two successive cycles.

The graphs also exhibit that a case of a slow motion (signal waveform α) and a case of a quick motion (signal waveform β) are distinguishable from each other by a difference in the period length of one waveform (or the length of a period between peeks of the signal).

While the feature that a sensor is not attached to a living body is the only difference from the first exemplary embodiment, an acquired signal can be treated in the same manner as the first exemplary embodiment.

The present invention can be embodied as a computer program. For example, functions of respective units in the input device 100 and the sensor signal acquisition unit 210 or respective flowcharts illustrated in FIGS. 4, 7, and 8 can be achieved as programs. Therefore, all or part of the present invention may be incorporated into hardware or software (including firmware, resident software, microcode, state machine, a gate array, and so on). Furthermore, the present invention may be a computer program product on a computer-usable or computer-readable storage medium, with a computer-usable or computer-readable program code being incorporated in the medium. In the context of this description, the computer-usable or computer-readable medium is any medium that enables recording, storage, communication, transmission, or conveyance of a program used by or together with an instruction execution system, apparatus, or device.

As described thus far, the present invention can achieve signal processing of analyzing data that have been sampled (acquired at a fixed time interval) by a sensor attached to a user, detecting motions that the user has repeated multiple times intentionally and rhythmically, and switching modes of a control target to be controlled. The present invention provides an advantageous effect that eliminating registering a motion pattern in advance or making it easy to accurately reproduce a motion pattern having been registered in advance enables errors in the determination of whether or not to set a mode of a control target to be controlled to be reduced.

REFERENCE SIGNS LIST

100 Input device
101 Sensor signal acquisition unit
102 Waveform comparison unit
102a Sequential state information storage unit
103 Mode setting unit
104, 803 Sequential evaluation data storage unit
110 Control Target Device
110a Music playback unit
201 Skin conductivity sensor
201 Skin conductivity sensor
202 Box unit
203, 204 Electrode
205 Attachment belt
210 Sensor signal acquisition unit
211 Conductivity conversion unit
212 Current control unit
213 Current source
800 Biosensor
801 Biological signal acquisition unit
802 Evaluation data distribution unit
804 Biological information detection unit
805 Intentional motion detection unit

The invention claimed is:

1. An input device comprising:
a sensor signal acquisition unit configured to acquire a sensor signal of one sensor;
a waveform comparison unit configured to evaluate a degree so as to consider waveforms of the sensor signal to be waveforms of two successive cycles by comparing the waveforms during the two successive cycles to each other on a time axis and determines that the waveforms are substantially identical to output information on whether or not a user repeats a certain motion, motion time per motion when it is determined that the user has repeated the certain motion, and information on a number of times that the user has repeated the certain motion; and
a mode setting unit configured to, on the basis of the information outputted by the waveform comparison unit, set a mode of a control target device to be controlled,
wherein the mode setting unit sets the mode of the control target device, when the waveform comparison unit outputs information indicating that the user repeats the certain motion, and
wherein the waveform comparison unit compares the waveforms with each other during the two successive cycles on the time axis to evaluate a correlation of sequentially sampled evaluation data for determining whether or not the waveforms during the two successive cycles are substantially identical,
wherein the certain motion may be either one of a registered motion and a non-registered motion.

2. The input device according to claim 1,
wherein the waveform comparison unit compares the waveforms with each other during the two successive cycles on the time axis to calculate a correlation coefficient for determining whether or not the waveforms during the two successive cycles are substantially identical.

3. The input device according to claim 2, wherein the calculation of the correlation coefficient is repeated while varying included pieces of evaluation data in each of the two successive cycles within a predetermined range.

4. The input device according to claim 3, wherein a maximum value of the calculated correlation coefficient is compared with a threshold value, the waveforms are determined to be substantially identical when the maximum value is larger than the threshold.

5. The input device according to claim 1,
wherein the waveform comparison unit compares the waveforms with each other during the two successive cycles on the time axis based on signs and areas thereof for determining whether or not the waveforms during the two successive cycles are substantially identical.

6. The input device according to claim 5, wherein the waveform comparison unit obtains adjacent differences of input data and evaluates a correlation based on patterns of the length of a period during which data having the same sign appear consecutively and the area of the data over the period in the adjacent differences.

7. The input device according to claim 1, wherein the mode setting unit detects the number of consecutive waveforms that are substantially identical, and sets a mode in accordance with the number of consecutive waveforms to the device as the object to be controlled.

8. The input device according to claim 7, wherein the mode setting unit, when waveforms during the two or more time intervals are determined to be substantially identical, waits for input of new pieces of evaluation data as many as the number of pieces of evaluation data that compose each of the two or more time intervals or a number close to the number of pieces of evaluation data, and compares a waveform of the newly-input pieces of evaluation data with the waveforms that have been determined to be substantially identical.

9. The input device according to claim 8, wherein the mode setting unit further comprises a repeat count storage unit, and when waveforms during the two or more time intervals are first determined to be substantially identical, sets an initial value to the repeat count storage unit.

10. The input device according to claim 9, wherein the mode setting unit, when a waveform of the newly-input pieces of evaluation data and the waveforms that have been determined to be substantially identical are determined to be substantially identical again, increments a repeat count stored in the repeat count storage unit.

11. The input device according to claim 7, wherein the mode setting unit, when waveforms during two time intervals that are adjacent to each other are determined to be substantially identical, performs comparison processing of comparing a waveform during another interval adjacent to the two time intervals in the direction of further going back to the past with the waveforms that are determined to be substantially identical, repeats the comparison processing to detect the number of consecutive waveforms.

12. The input device according to claim 1, wherein a positive or negative buffer is provided between the two successive cycles.

13. The input device according to claim 1, wherein the sensor signal is a signal sampled by a sensor that is configured to be attached to a living body.

14. The input device according to claim 1, wherein the sensor signal is a signal sampled by an infrared sensor.

15. The input device according to claim 1, wherein the mode setting unit sets the mode of the control target device in accordance with a time length of the waveforms that are substantially identical.

16. The input device according to claim 1, further comprising a sequential evaluation data storage unit configured to store evaluation data that are the sensor signal or data obtained by processing the sensor signal using a predetermined processing method.

17. The input device according to claim 16, wherein
the waveform comparison unit further comprises a sequential state information storage unit,
the sequential state information storage unit is configured to store sequential parameter sets of a sign information, a number information and an area information, and
each of the parameter sets is corresponding to a sub-period during which the evaluation data having the same sign appear consecutively, and
the sign information is the same sign of the sub-period, and
the number information is the number of the evaluation data in the sub-period, and
the area information is the total sum of values or absolute values of the evaluation data in the sub-period, and
the waveform comparison unit is configured to perform comparison based on the sequential parameter sets of two adjacent periods.

18. The input device according to claim 17, wherein the sign information includes any of three patterns of signs including a positive sign, a negative sign, and 0, by setting a predefined threshold value or a threshold value that is automatically adjusted in accordance with a magnitude of an input signal and, when an absolute value of an evaluation data is lower than the threshold value, replacing the evaluation data with 0.

19. The input device according to claim 16, wherein the waveform comparison unit performs comparison based on a difference among each combination of values of the evaluation data that correspond to one another in a chronological manner of the two successive cycles or a value obtained by processing the difference using a predetermined processing method.

20. The input device according to claim 1, wherein
the control target device further comprises a music playback unit, and
the mode setting unit converts a time length of the waveforms that have been determined to be substantially identical into a tempo and, when the tempo and a tempo of a piece of music being played back by the music playback unit have a correlation, discards the determination that the waveforms are substantially identical.

21. The input device according to claim 1,
wherein
the input device is used in conditions in which a piece of music is played back during each of the two successive cycles.

22. The input device according to claim 1, wherein, when it is determined that the user repeats the certain motion, the waveform comparison unit outputs information on a motion time per motion and information on the number of repeats.

23. A method of setting a mode of a control target device by using an input device, comprising:
acquiring a sensor signal from one sensor of the input device;
evaluating a degree so as to consider waveforms of the sensor signal to be waveforms of two successive cycles by comparing the waveforms during the two successive cycles to each other on a time axis and determining that the waveforms are substantially identical to output information on whether or not a user repeats a certain motion, motion time per motion when it is determined that the user has repeated the certain motion, and information on a number of times that the user has repeated the certain motion; and
on the basis of the information, setting a mode of the control target device to be controlled,
wherein the mode of the control target device is set when the information indicates that the user repeats the certain motion, and
wherein the waveforms are compared with each other during the two successive cycles on the time axis to evaluate a correlation of sequentially sampled evaluation data for determining whether or not the waveforms during the two successive cycles are substantially identical,
wherein the certain motion may be either one of a registered motion and a non-registered motion.

* * * * *